(12) United States Patent  (10) Patent No.: US 7,154,452 B2
Nakamura et al.  (45) Date of Patent: Dec. 26, 2006

(54) ELECTRONIC PAPER, ELECTRONIC PAPERFILE AND ELECTRONIC PEN

(75) Inventors: Tetsuroh Nakamura, Takaraduka (JP); Masaichiro Tatekawa, Minoo (JP); Hiroyuki Matsuo, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 448 days.

(21) Appl. No.: 10/204,596

(22) PCT Filed: Feb. 22, 2001

(86) PCT No.: PCT/JP01/01329

§ 371 (c)(1),
(2), (4) Date: Aug. 23, 2002

(87) PCT Pub. No.: WO01/63585

PCT Pub. Date: Aug. 30, 2001

(65) Prior Publication Data

US 2003/0020701 A1   Jan. 30, 2003

(30) Foreign Application Priority Data

Feb. 25, 2000 (JP) ............................. 2000-049733
Feb. 25, 2000 (JP) ............................. 2000-049734
Feb. 25, 2000 (JP) ............................. 2000-049735

(51) Int. Cl.
*G09G 5/00* (2006.01)

(52) U.S. Cl. ...................... 345/1.1; 345/901; 345/173; 178/18.03; 434/317

(58) Field of Classification Search ........ 345/173–183, 345/905, 901, 204–206, 1.1, 104; 178/18.01–18.11, 178/19.01–19.07; 18/18.01, 18.03, 18.04, 18/18.05, 18.06, 18.07, 18.08, 18.09, 19.01, 18/19.02, 19.03, 19.04, 19.05; 434/317
See application file for complete search history.

(56) References Cited

U.S. PATENT DOCUMENTS

| 4,629,289 | A | * | 12/1986 | Streit | 349/149 |
|---|---|---|---|---|---|
| 5,060,980 | A | * | 10/1991 | Johnson et al. | 283/70 |
| 5,417,575 | A | * | 5/1995 | McTaggart | 434/317 |
| 5,534,888 | A | * | 7/1996 | Lebby et al. | 345/672 |
| 5,739,814 | A | * | 4/1998 | Ohara et al. | 345/173 |
| 6,002,387 | A | * | 12/1999 | Ronkka et al. | 345/157 |
| 6,005,545 | A | * | 12/1999 | Nishida et al. | 345/603 |

(Continued)

FOREIGN PATENT DOCUMENTS

JP    1174/1985    1/1985

(Continued)

OTHER PUBLICATIONS

"Japan Hardcopy '99—The Collected Papers", The Imaging Society in Japan, pp. 209-251.

*Primary Examiner*—Lun-Yi Lao
(74) *Attorney, Agent, or Firm*—McDermott Will & Emery LLP

(57) ABSTRACT

The invention has an object to provide the electronic paper file, which an electronic paper can be attached to or detached from by providing a connecting terminal including the physical or electrical connecting function to both the electronic paper and the main unit. Since the display data is to be displayed on the nonvolatile display medium fitted to the display of the electronic paper, the electronic paper detached from the main unit can retain the display content. Since the connecting terminal fitted to the main unit is fixed to the rotatable rotatable axis, it is possible to retain the desired page with keeping double-pages spread.

28 Claims, 34 Drawing Sheets

U.S. PATENT DOCUMENTS

| | | | |
|---|---|---|---|
| 6,052,117 A * | 4/2000 | Ohara et al. | 345/173 |
| 6,124,851 A * | 9/2000 | Jacobson | 345/206 |
| 6,160,540 A * | 12/2000 | Fishkin et al. | 345/184 |
| 6,284,988 B1 * | 9/2001 | Watanabe et al. | 200/5 A |
| 6,405,167 B1 * | 6/2002 | Cogliano | 704/251 |
| 6,498,597 B1 * | 12/2002 | Sawano | 345/107 |
| 6,850,230 B1 * | 2/2005 | Vincent et al. | 345/179 |
| 6,940,497 B1 * | 9/2005 | Vincent et al. | 345/204 |
| 2002/0055938 A1 * | 5/2002 | Matsuo et al. | 707/104.1 |
| 2004/0070633 A1 * | 4/2004 | Nakamura et al. | 345/860 |

FOREIGN PATENT DOCUMENTS

| | | | |
|---|---|---|---|
| JP | 62-266521 | | 11/1987 |
| JP | 4-355786 | | 12/1992 |
| JP | 04-355786 | * | 12/1992 |
| JP | 5-19234 | | 1/1993 |
| JP | 5-165411 | | 7/1993 |
| JP | 06-274458 | * | 9/1994 |
| JP | 8-166589 | | 6/1996 |
| JP | 11-502950 | | 3/1999 |

* cited by examiner (a)

(b)

(a)

(b)

FIG.11
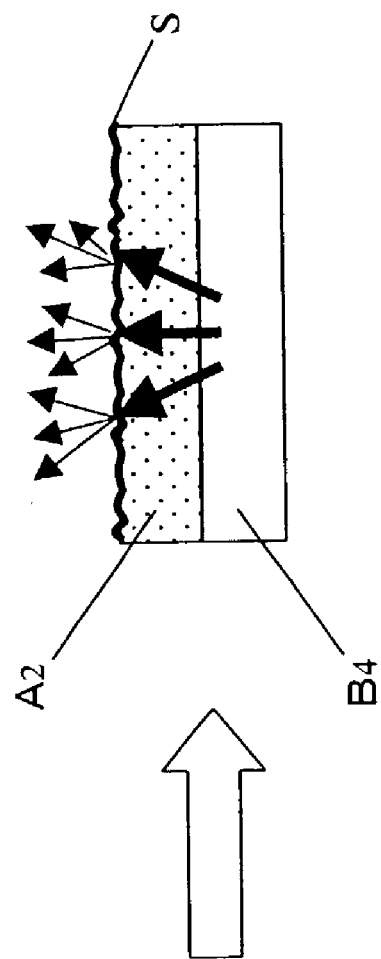
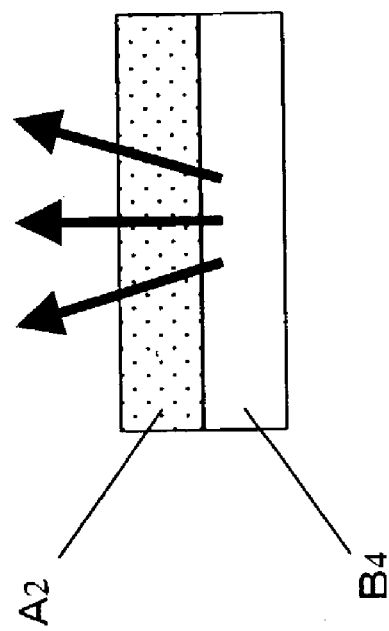

(a)

(b)

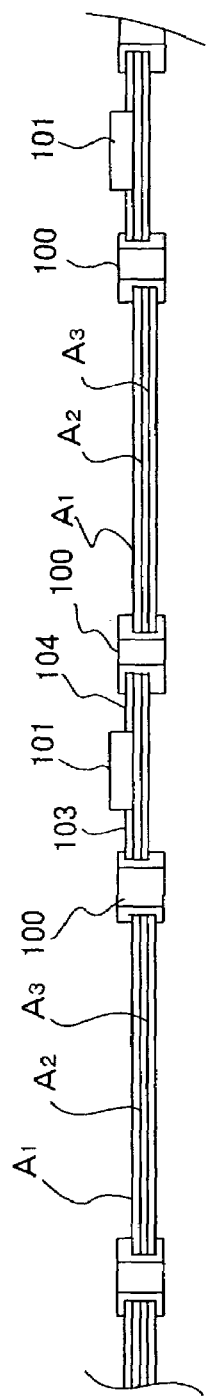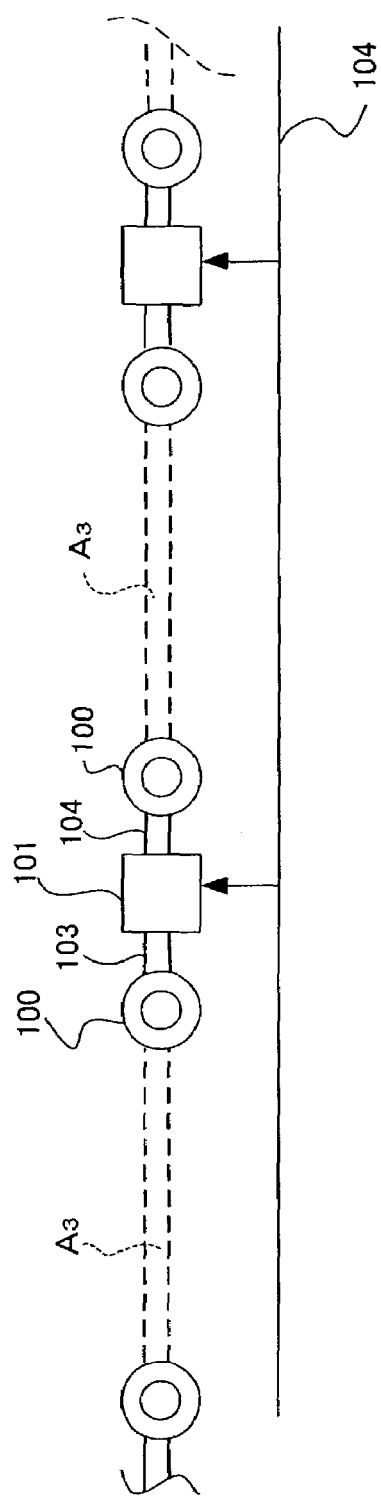
FIG.24 (a)
FIG.24 (b)

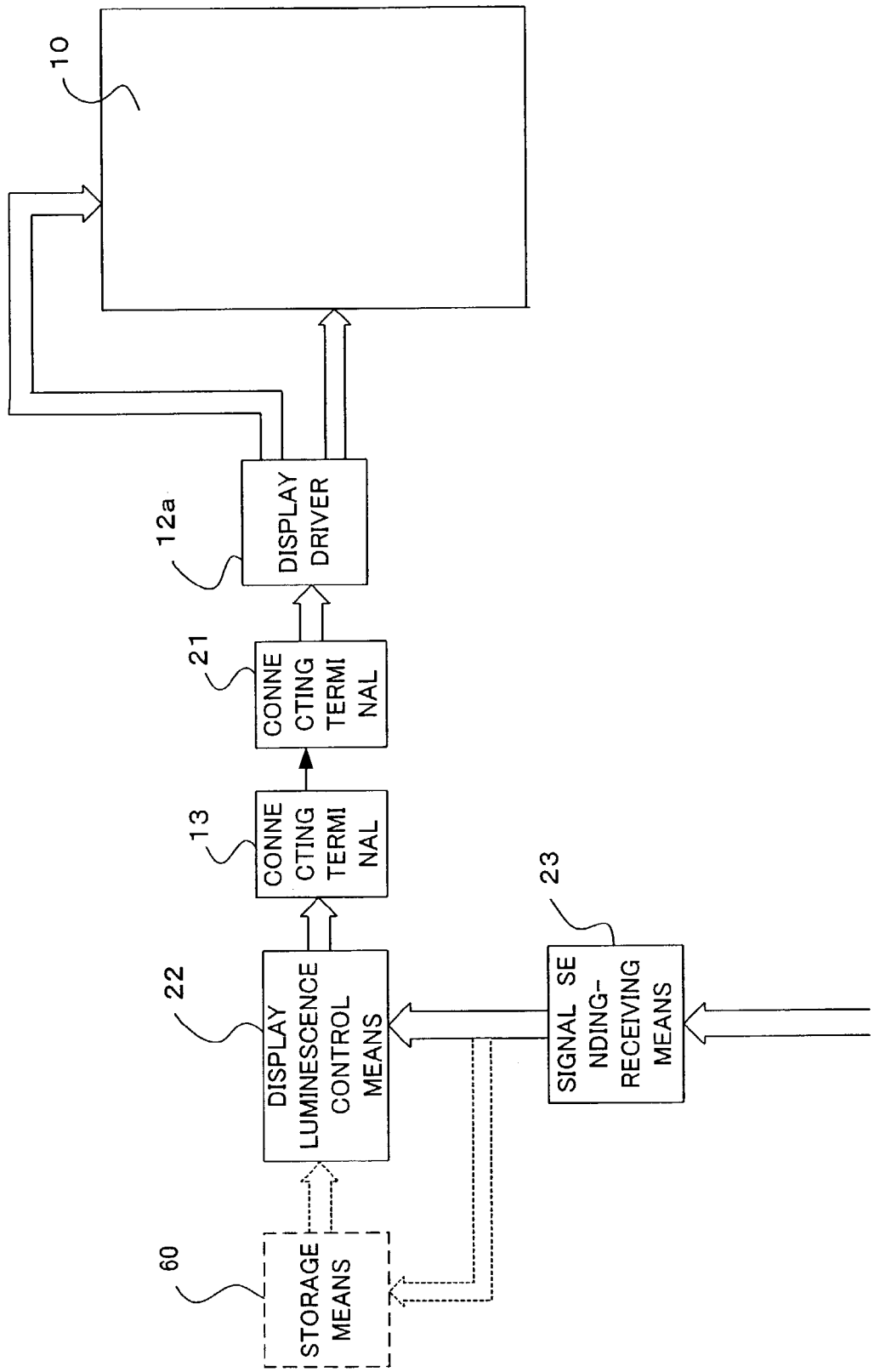

ELECTRONIC PAPER, ELECTRONIC PAPERFILE AND ELECTRONIC PEN

TECHNICAL FIELD

The invention relates an electronic paper that is a display medium flexible like paper, and an electronic paper file comprising a plurality of said electronic papers bound like the book.

DESCRIPTION OF THE RELATED ART

With the advance of the information society, the performance of the display medium such as CRT (Cathode Ray Tube), LCD (Liquid Crystal Display) and so on has been improved rapidly. However, regarding the legibility and user-facility, such display mediums are not superior to the "paper" that has been used as an information medium from a long time ago. Consequently, the "electronic paper" is proposed as a new concept for the above sheet-like flexible display medium, and the various technologies have been studied in order to carry out this electronic paper (Pages 209 to 251 of "Japan Hardcopy'99—The Collected Papers" published by The Imaging Society in Japan).

Additionally, it is also proposed in these days the electronic paper file filing plural electronic papers like a book (PCT Japanese translation publication No.11-502950). With the help of such electronic paper file, it is possible not only to simplify the management of plural electronic papers, but also to use the electronic papers as the more legible and user-facile display medium.

The display medium to be applied to the electronic paper is a volatile or nonvolatile liquid crystal. In case of the volatile display medium, the display goes dark when the electronic paper is cut off from the power. On the other hand, in case of the nonvolatile display medium, the displaying content can be kept even when the electronic paper is cut off from the power. This is beneficial because the electronic paper can be handled as well as a sheet. However, after the display content is deleted temporarily in order to rewrite, a user has to execute the rewriting. Therefore, it is necessary to select for the electronic paper the nonvolatile material able to rewrite the display content easily.

The material of thus rewritable nonvolatile display medium has been studied in many ways (see pages 209 to 251 of "Japan Hardcopy'99—The Collected Papers" published by The Imaging Society in Japan). For instance, there is the thermosensitive recording type of nonvolatile display medium wherein the color developing and erasing are performed by means of the leuco dye and the developer. This nonvolatile display medium develops colors when it is heated until the leuco dye and the developer blend. Where the condition of the color developing cools down gradually, the color is erased. Meanwhile, when the condition cools down suddenly, the color developing is fixed; thereby illustrated images can be retained. That is to say, the rewriting and the deleting are executed by the heat control.

In addition, there is a nonvolatile display medium that is the Guest-Host type adopting the smectic liquid crystal and the dichronic dye and uses the liquid crystal/polymer composite film. The nonvolatile display medium becomes the focal conic state wherein the dichronic dye is oriented together with the liquid crystal by heat, thereby the light absorption increases and the display medium develops colors. And then, by impressing the electric field on the color-developing display medium, the focal conic state changes to the homeotropic state, and then the colors are erased. In other words, the heat is to rewrite and the electric field is to erase. Besides, one of the Guest-host types of liquid crystal can develop colors by the voltage and erase them by the heat.

And there is a nonvolatile display medium adopting the electrophoresis phenomenon of pigment particles dispersed in the coloring solvent, which is configured to encapsulate such dispersion solution in a microcapsule. In this case, the rewriting and the erasing are executed by the electric field.

Moreover, there is a nonvolatile display medium configured so that cells containing the conductive toner and white corpuscular are filled between a pair of transparent electrodes. Under this configuration, the rewriting is performed as follows: the voltage is impressed between the pair of transparent electrodes, which moves the conductive toner toward the other electrode by the clone attractive force. Therefore, in case of the erasing, the reverse electric field is to be impressed between the pair of transparent electrodes.

The aforementioned thermosensitive recording type of nonvolatile display medium using the leuco dye and the developer performs the rewriting and erasing by heat as described above. Accordingly, the thermal stylus is used for the rewriting; meanwhile the thermal eraser utilizing the infrared lamp is used for the erasing.

The other input device for inputting characters and graphics into the rewritable display medium is the digitizer, for example. The digitizer is provided with wires or printed wires interlaced in lattice-like in the direction of the orthogonal two axes on the flat plate. When the pulse is transmitted to the two axes, the position of the intersection is detected in result of reading the pulse by an electronic pen or the like; thereby the input processing is performed. The light pen is provided at the top with a photo acceptance element. The photo acceptance element reads the position on the display, which performs the input processing.

And now, a loose-leaf book or notebook made from paper has a merit that only a desired page can be removed and carried on. However, regarding the above-mentioned conventional electronic paper file it is impossible to remove and carry out only a specific electronic paper since the electronic paper and the main unit itself (the front board) controlling the electronic paper are integrated in one unit.

In addition, where a specific content is displayed on the electronic paper, it is general that the display content is the one stored as electronic data in a memory of the main unit or the one transmitted from an external memory. For this purpose, it may utilize the volatile display medium as the display medium of the electronic paper. However, in order to remove and carry on only the electronic paper separating from the main unit as described above, it is necessary for each electronic paper to maintain the display even in the condition that the power is cut off. However, in case of using the volatile display medium as above, when the electronic paper is removed from the main unit, it becomes impossible to keep the condition of display.

As mentioned above, the electronic paper is requested the same portability as the ordinary paper, and at the same time sometime requested the function to reflect the handwritten characters and graphics on the electronic paper or to delete the content inputted from the memory or written by hand as above.

In this case, on the basis of the conventional art, each electronic paper must be provided with the digitizer and receive the position that the user designates on the digitizer. On the position thus designated, the control means arranges a specific pixel. However, installing the digitizer in all the electronic papers respectively causes the device to be costly.

Moreover, it has been promoted the approach to render the rewriting and the erasing by the heat or the electric field, but in case of using the heat there is a possibility that the medium is damaged and deteriorated by the heat. In order to cope with this trouble, the following countermeasures has been studied; the arrangement that the surface of the medium is provided with a hard coating layer, the contactless means applying the laser and so on. However, those have not been in the practical use.

Where the rewriting and erasing by the electric field do not depends on using the digitizer, it is necessary to impress the voltage on the display medium directly. But it is general that the surface of the liquid crystal display is not provided with any electrode for impressing the voltage on the display medium directly.

The present invention is proposed in consideration of the abovementioned conventional conditions, and has an object to provide the electronic paper file wherein each electronic paper of the electronic paper file can be attached to or detached from the main unit. And the invention also has another object to provide the inexpensive electronic paper wherein the user can rewrite in or delete from the display medium by hand without using the heat.

DISCLOSURE OF THE INVENTION

The invention comprises following means in order to achieve the above object, that is to say, the invention depends on an electronic paper file comprising an electronic paper 10 and a main unit 20 as shown in FIGS. 1, 2 and 34.

The electronic paper 10 is a flexible display medium like paper. And the main unit 20 provides a display 11 of this electronic paper 10 with display luminescence control means 22 for displaying display data obtained from signal sending-receiving means 23 (23a and 23b shown in FIG. 6). Moreover, the electronic paper may be provided with storage means 60 for storing the display data.

A pair of a male and female type of connecting terminals having the physical and electrical connecting functions, one connecting terminal 13 of which is provided to a side of the display 11 of the electric paper 10 and the other connecting terminal 21 of which provided to the main unit 20, these configuration allows the electronic paper 10 to be attached to or detached from the main unit 20. At this time, the connecting terminal 13 of the electronic paper is the female type and the connecting terminal 21 of the main unit 20 is the male type, thereby even in case of carrying the electronic paper 10 detached from the main unit 20 the connecting terminal 13 of the electronic paper can be prevented from the damages and rust.

As the configuration for fitting the connecting terminal 21 of the main unit 20 on the main unit 20, one is to fix the arrangement position of the connecting terminal 21 as shown in FIGS. 1 and 2, and another is to provide the rotatable axis part rotatably connected to the main unit 20 with the connecting terminal 21 as shown in FIG. 15.

There is a possibility that the display luminescence control means 22 executes the displaying for the connecting terminal 21 of the main unit to which the electronic paper 10 is not attached. In order to settle this problem, the electronic paper file is provided with attachment detecting means 30 for detecting the condition whether the electronic paper 10 is attached to the connecting terminal 21 of the main unit or not. According to the condition of attachment, the display luminescence control means 22 performs the display processing. According to this configuration, it is possible to perform the display processing only for the connecting terminal to which the electronic paper is attached.

In addition, the electronic paper file adopts the following configuration to display the display data on the electronic paper file in the order of pages of the electronic paper file. Specifically, if the arrangement position of the connecting terminal 21 of the main unit is fixed to main unit 20, the main unit 20 is provided with storage means 19 (See FIG. 13 & FIG. 29) for storing the connecting terminal number based on the arrangement position of the connecting terminal. According to the connecting terminal number and the condition of attachment, the display luminescence control means 22 is to perform the displaying. Under the configuration that the connecting terminal 21 of the main unit is fitted to a rotatable axis part 50, the display luminescence control means is to perform the displaying based on the rotation position of the connecting terminal 21 detected by the position detecting means 30 and the condition of attachment.

As mentioned above, where two parts of the connecting terminal 13 of the electronic paper and the connecting terminal 21 of the main unit make a pair and the positions to arrange each connecting terminal 21 are different each other, the connecting terminal 13 of the electronic paper must be arranged on the position corresponding to the each connecting terminal 21. Therefore, adopting the following configuration makes possible to connect the connecting terminal 21 of the main unit with the connecting terminal 13 of the electronic paper independently of the position of the connecting terminal 21 of the main unit.

In other words, the electronic paper 10 is provided with a plurality of parallel leads in parallel with the end side. On the other hand, the connecting terminal 21 of the main unit is provided with holding plates 41 for holding the electronic paper 10 from both the backside and front side. And the internal surface of the holding plate is provided with conducting leads 42 of which top contacts to the each parallel lead 40 and as much as the number of leads 40 of the electronic paper.

Additionally, the display 11 of the electronic paper 10 is provided with a display layer A comprising the nonvolatile display medium possible to perform the pattern display, as shown in FIG. 3. According such configuration, the display data is displayed on the nonvolatile display medium, and in result the electronic paper detached from the main unit 20 can retain the display content.

Moreover, where the display 11 of the electronic paper 10 is configured to be provided with a luminescence layer B for illuminating the display layer A, it is possible to confirm the display content of the electronic paper 10 in the dark.

Besides, the main unit 20 of the electronic paper file may be provided with display luminescence control means 22 for controlling the luminescence layer B so as to illuminate only a specific area of the display layer A. According to this configuration, it is possible to illuminate only the area that the user wants to emphasize, such as a title area. And if the display luminescence control means 22 is also arranged to control the emitting area of the luminescence layer B, the area to be illuminated can be changed.

Besides, when the power is applied to the electronic paper or when a physical switch fitted to the main unit is pushed by the user, the display luminescence control means 22 may make the luminescence layer B luminous.

In addition, the display luminescence control means 22 may comprises display control means 22a for controlling the display of the display data on the electronic paper and luminescence control means 22b for controlling the luminescence layer B so as to illuminate only the specific area of the display layer A. The luminescence control means 22b may make the luminescence layer B luminesce when the power is applied to the electronic paper or when a switch fitted to the main unit physically is pushed by the user.

In the above description, the data to be displayed on the electronic paper is the one transmitted from the external of the electronic paper file or the one stored in the storage means 60, but the electronic paper can be configured to display on the electronic paper the data that the user direct writes into the electronic paper.

Specifically, the electronic paper 10 is configured that the voltage corresponding to the writing (the deleting) can be impressed per pixel, thereby the user should write or delete the data on the electronic paper with an electronic pen 114.

In this case, either a column or a line electrode per pixel arranged on the back of the front side of the display is connected one after another through contact electrodes arranged per pixel on the front of the front side of the display and switch means 101. The electronic paper 10 is provided with a control line 104 for controlling the switch means 101.

In case of displaying the data transmitted from the storage means 60, there is a necessity to reflect the written or deleted data on the content stored in the storage means 60. Therefore, the invention is configured to comprise writing detecting means 105 for detecting that the electronic pen contacts to the contact electrode, extracting the written data and transferring the data to the storage means 60.

As a matter of course, it is possible to write into (or delete from) the electronic paper by using the digitizer. In this case, the electronic paper 10 on which the digitizer overlaps can be detected by the rotation angle of the digitizer 15 and the main unit 20.

Further more, the characters and graphics that are illustrated physically on the electronic paper with ink can be converted to the data to be displayed on the electronic paper by reading the condition of the electronic paper with the scanner and so on.

BRIEF DESCRIPTION OF THE DRAWINGS

FIG. 11 is an explanatory diagram of the rough surface.

FIG. 24 is a diagram showing the configuration of the electronic paper in case of the direct writing.

FIG. 34 is a block diagram showing the basic configuration of the invention.

BEST MODE FOR CARRYING OUT THE INVENTION

Embodiment 1

The embodiment of the invention is explained according to attached drawings.

Figure 1:
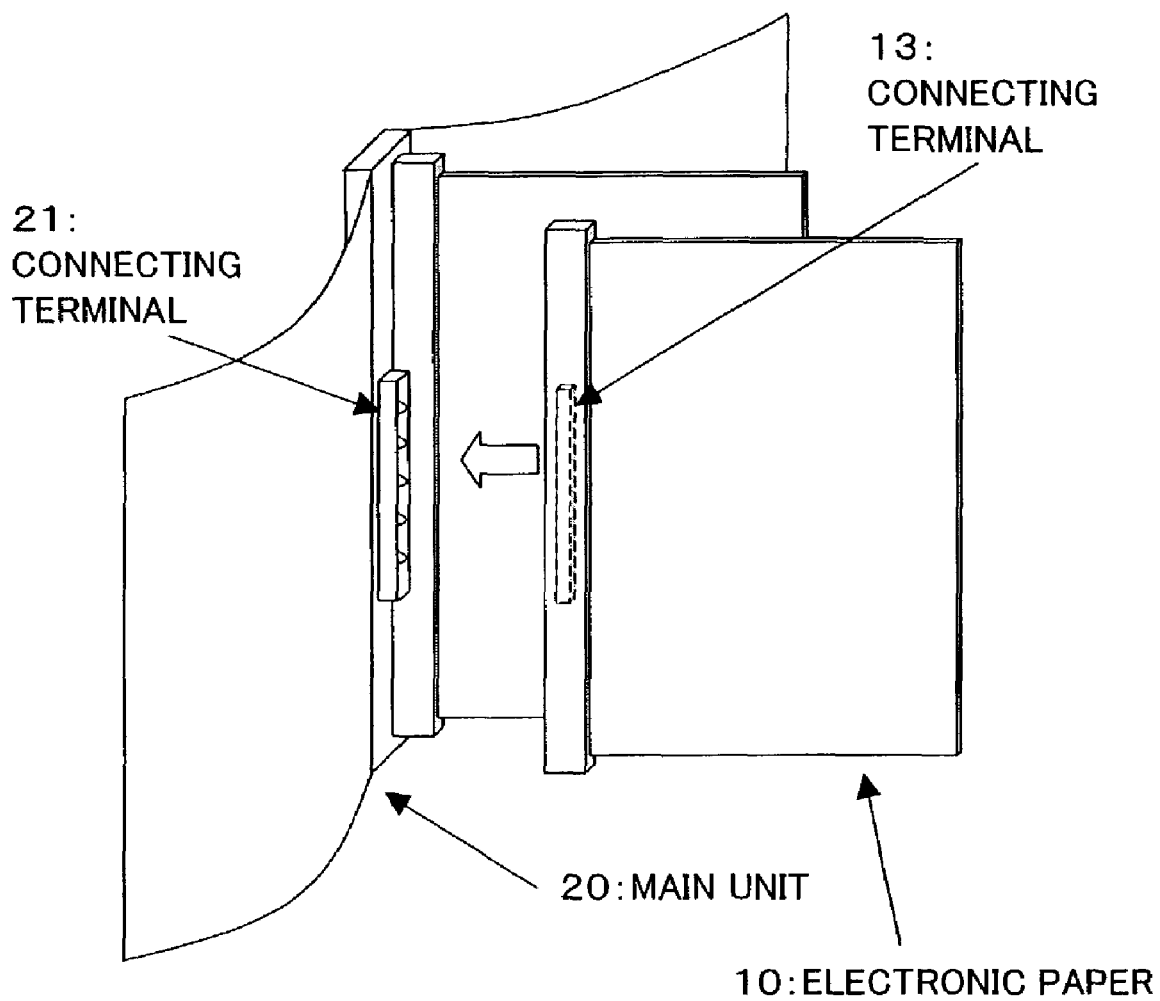
FIG. 1 is an outline view of the electronic paper file applying the invention.
Figure 2:
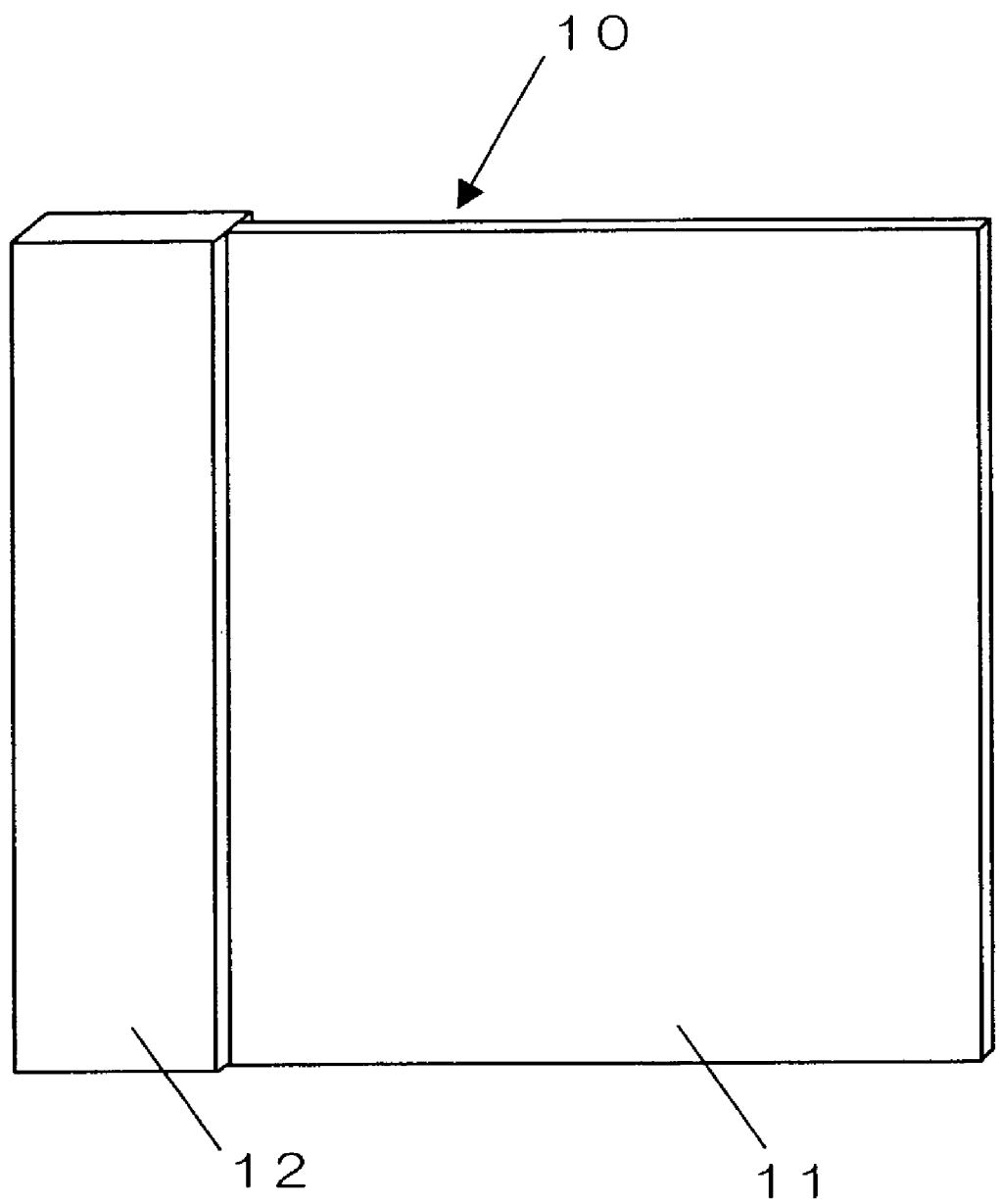
FIG. 2 is an outline view of the electronic paper applying the invention.
Figure 3:
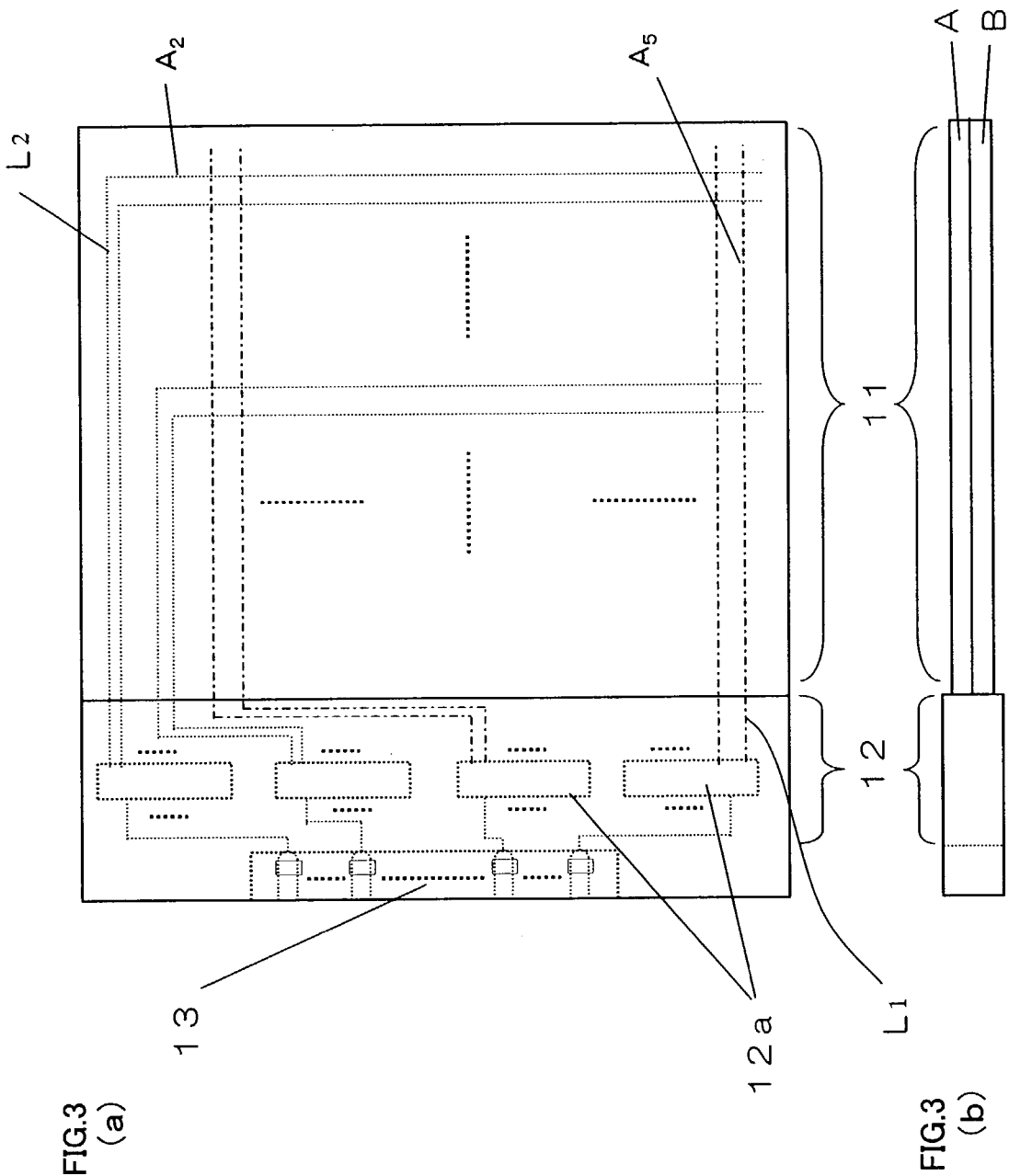
FIG. 3a is block diagram of the electronic paper applying the invention.
FIG. 3(b) is a side elevation of the electronic paper file.

First of all, the invention in mono color is explained here in detail. FIG. 1 is a perspective view showing the configuration of the invention. FIG. 34 is a block diagram showing the electrical configuration of the invention. FIG. 2 and FIG. 3 are conceptual diagrams showing particulars of the electronic paper.

As shown in FIGS. 2 and 3, the electronic paper 10 applying the invention comprises a display 11 that is an area for displaying data, and a display driver unit 12 (a data non-display area) for driving the display 11. The display 11 comprises a display layer A provided with a nonvolatile display medium and a luminescence layer B for illuminating the display layer A.

Figure 4:
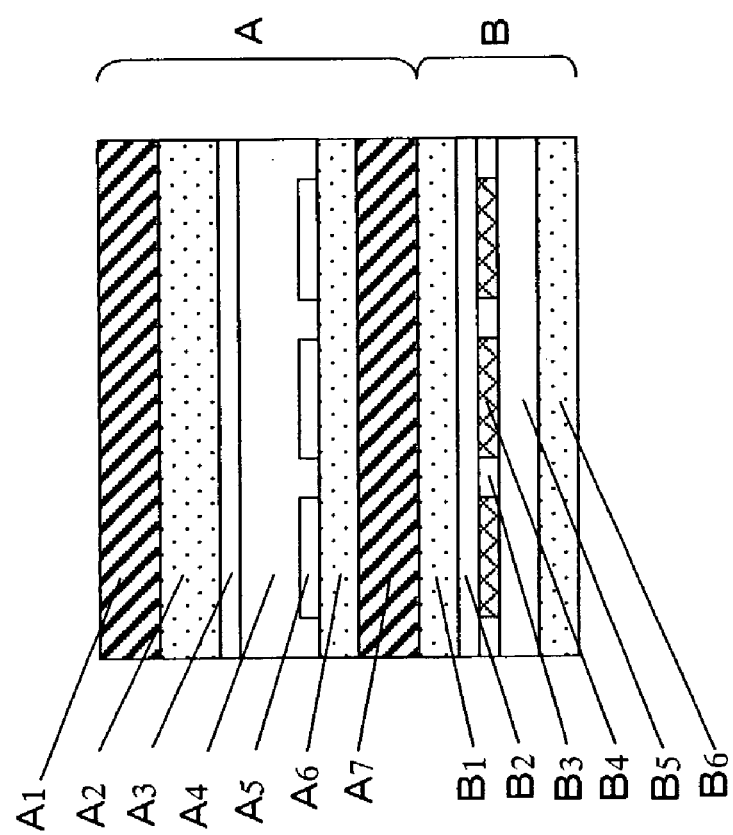
FIG. 4 is an example of the configuration of the display layer and the luminescence layer.

That is to say, first a column electrode $A_3$ is formed on an upper base film $A_2$, meanwhile, a line electrode $A_5$ is formed on the lower base film $A_6$ as shown in FIG. 4. Secondarily, a ferroelectric high polymer liquid crystal $A_4$ specific thick is applied to this line electrode $A_5$. And thirdly, the column electrode $A_3$ is pasted to the line electrode $A_5$ so as to come face to face each other and be in a form of the matrix. In addition, after molecules of the ferroelectric high polymer liquid crystal $A_4$ are oriented toward a specific direction, these layers are held and bonded with deflection plates $A_1$ and $A_7$ from both sides. Thereby, the display layer A is formed, which comprises pixels formed in the matrix of Cmax columns and Rmax lines. It is needless to say that the positions of the line electrode and column electrode can be exchanged mutually.

In contradiction to this, on the basis that the whole area of the luminescence layer B may emit a light equally in the intensity, the luminescence layer B is formed as follows: a transparent common electrode (anode) $B_2$ is formed on the upper base film $B_1$ and a metal common electrode (cathode) $B_5$ is formed on the lower base film $B_6$. By means of an insulating layer $B_3$, an organic electro luminescence layer $B_4$ is formed in a specific pattern on the common electrode $B_5$. After that, the common electrode $B_2$ is pasted to the common electrode $B_5$ so as to come face to face each other.

In the last place, the luminescence layer B thus formed is pasted to the downside of the display layer A so that the luminescence layer B may illuminate the display layer A.

The ON and OFF of pixels on the above-mentioned display sheet shall be controlled by the matrix control utilizing the shutter function explained as follows. That is to say, when a specific voltage is impressed between the line electrode $A_5$ and column electrode $A_3$ of the display layer A, the molecules of ferroelectric high polymer liquid crystal $A_4$ changes the orientation to the direction not passing the light emitted from the luminescence layer (which means that the shutter is ON), and thereby the pixels specified by the line electrode $A_5$ and the column electrode $A_3$ are displayed in black. On the other hand, when the reverse voltage to the above specific voltage is impressed, the molecules of the ferroelectric high polymer liquid crystal $A_4$ changes the orientation to the direction passing the light (which means that the shutter is OFF), and thereby those pixels are displayed in white.

Besides, the displaying condition of the ferroelectric high polymer liquid crystal $A_4$ will not change even when the power is cut off. Therefore, even where the specific voltage is not impressed between the line electrode and the column electrode after the electronic paper 10 is detached from the main unit 20, it is possible to retain the display content.

On the other hand, when the voltage is impressed between the common electrodes B2 and B5 of the luminescence layer B, the whole area of the organic electro luminescence layer $B_4$ emits light and illuminates the display layer A from the downside. That is to say, where the organic electro luminescence layer $B_4$ emits the light, the pixels, which allow the light to pass through (of which shutter are OFF), are displayed in black.

Besides, the luminescence layer B depends on the premise that the whole area of it emits light simultaneously, and for this purpose both of the upper and lower electrodes are the common electrodes. However, where the upper and lower common electrodes $B_2$ and $B_5$ may be arranged in the form of matrix and can be controlled so as to illuminate only a specific part of the display layer A, it becomes possible to display (or emphasize) title parts only, for example.

Additionally, in case of making the luminescence layer B luminesces in mono-color, a monochromatic electro luminescence layer may be formed evenly allover the whole area on the luminescence layer as described above. On the contrary, in case of making the layer B luminesces in full-color, RGB (Red, Green, Blue) light sources may be formed in matrix on the luminescence layer B. In case of making the whole area luminesces even in full-color, it is not necessary that the electrode should be formed in matrix as described above, but it is sufficient to make RGB electro luminescence layer radiate simultaneously by means of the common electrodes $B_2$ and $B_5$.

Either one surface of the base films $A_2$ or $A_6$ of the display layer A or the base film $B_1$ of the luminescence layer B is preferable to be rough. Under such arrangement, it is possible to provide the display gentle with eyes because the light emitted from the organic electro luminescence layer $B_4$ is dispersed by a rough surface S as shown in FIG. 11.

In order to impress the voltage on the display layer A and the luminescence layer B or to control the display as described above, the line electrodes $A_5$ and the column electrode $A_3$ or the common electrodes $B_2$ and $B_5$, those comprising respective layers, must be connected previously with display luminescence control means 23 provided to the main unit 20 or the power. On the other hand, there is a case where a user wants to detach a desired electronic paper 10 from the main unit 20 in the same way of detaching only a desired page from a loose-leaf type of paper book.

Therefore, the invention comprises an arrangement that the electronic paper 10 and the main unit 20 configured as above can be attached and detached physically and electrically.

That is to say, the invention is arranged as shown in FIG. 1 so that a connecting terminal 13 (a female type in this case) may be fitted to one side of the display driver unit 12 of the electronic paper 10, and the other connecting terminal 21 (a male type in this case) may be fitted to a side of the main unit 20. In such way, the invention is arranged that the connecting terminal 13 of the electronic paper 10 be the female type and the connecting terminal 21 of the main unit 20 be the male type. This is for preventing the connecting terminal 13 of the electronic paper from the damage and rust.

In case of controlling those pixels configured in the matrix of Cmax lines and Rmax columns, the connecting terminal 13a is required to have pins as much as the number of Cmax+Rmax (the connecting terminal 21 provided with pin receivers as much as the number of Cmax+Rmax). However, the connecting terminal 13 provided with many pins is easy to damage. In addition to this demerit, such type is not preferable as seen from the point of view that the electronic paper should be thin and lightweight.

Therefore, the invention is arranged as shown in FIG. 3(a) so as to reduce the number of pins of the connecting terminal by incorporating the display driver 12a, which is used for the general LCD display device, between the connecting terminal 13 of the electronic paper 10 and the display 11 (namely, into the display driver unit 12), which will be described later.

Figure 5:
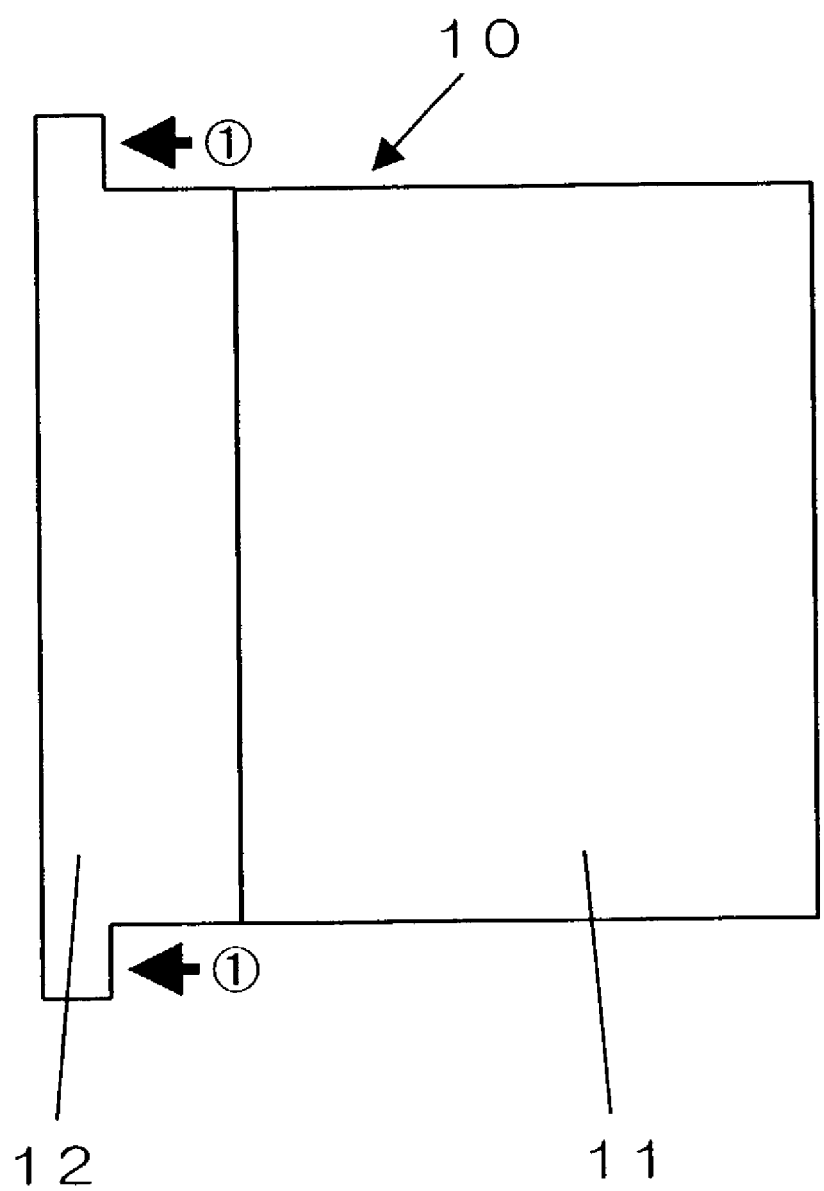
FIG. 5 is another embodiment of the electronic paper applying the invention.

In order to make easy to detach or attach the electronic paper from or to the main unit 20, it is preferable as shown in FIG. 3(b) that the thickness of the display driver unit 12 may increase more than that of the display 11 and the material used for the display driver unit 12 has the Young's modulus more than that of the display 11. Thereby, it makes possible to protect the display driver 12a comprising the semiconductor chip. In addition, where the width of the display driver unit 12 is extended more than that of the display 11, the connecting terminal 13a of the electronic paper 10 can be attached to the connecting terminal 21a of the main unit 20 without failure in a simple way like pushing the display driver unit 12 from the direction indicated by the arrow ① with finger as shown in FIG. 5.

In the invention, it is arranged that the abovementioned display control and luminescence control be executed by display luminescence control means 22 installed in a spine 24 of the main unit 20 (display luminescence control means comprises display control means 22a and luminescence control means 22b, and these two means may be formed in a unit or separately).

The following explains about the display control executed by the display luminescence control means 22 (or the luminescence control means 22b). Besides, the display luminescence control means 22 or the luminescence control means 22b may make the luminescence layer B radiate when the power of the electronic paper file is ON or when a user presses down a key for instructing the display.

Figure 9:
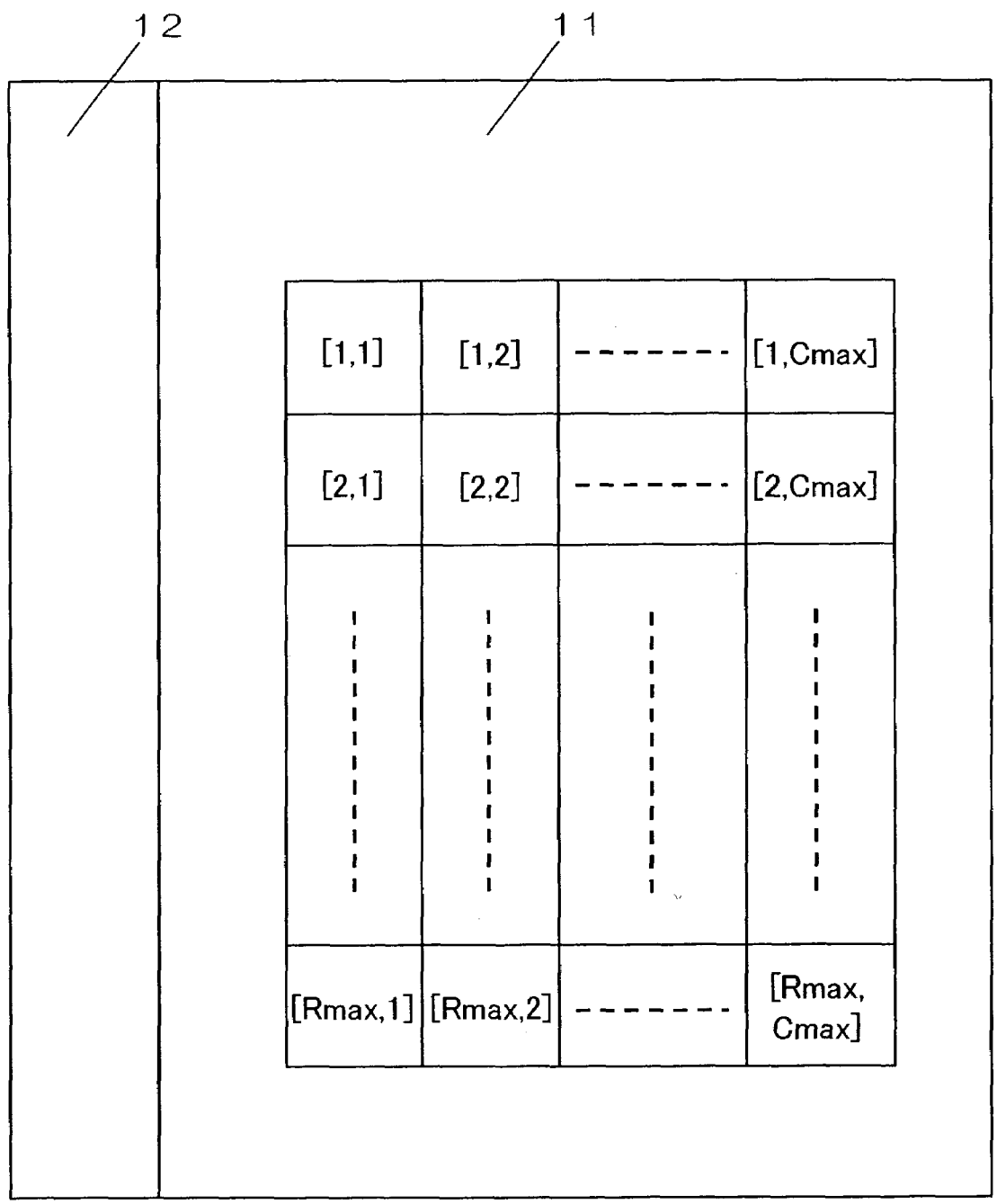
FIG. 9 is a view explaining the matrix.
Figure 10:
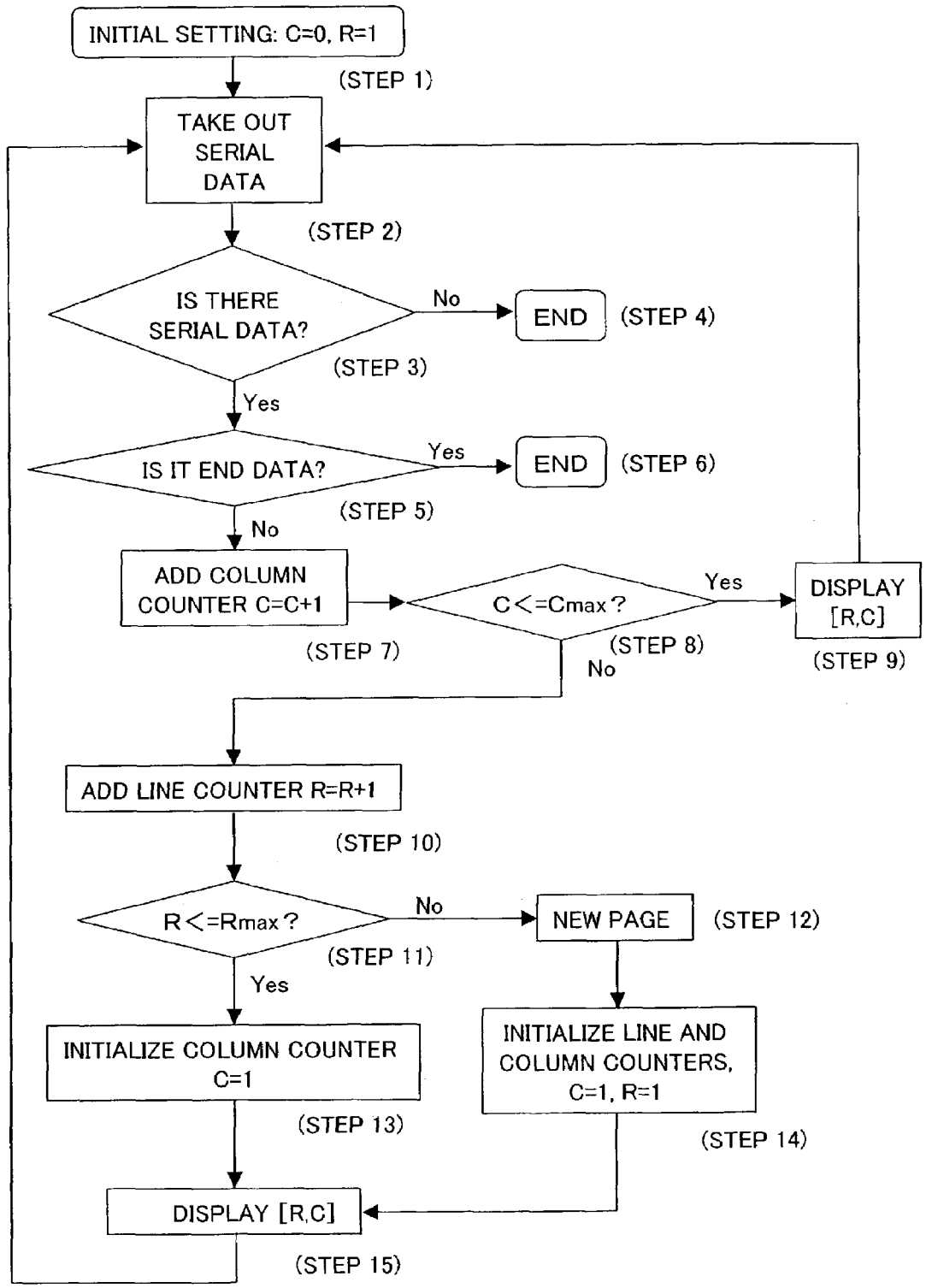
FIG. 10 is a flowchart showing the display processing of the invention.

That is to say, where binary serial data received from after-mentioned signal sending-receiving means 23 is displayed on the display layer A (see FIG. 9) comprising pixels configured in the form of matrix of Cmax lines and Rmax columns, as the initial setting the display luminescence control means 22 sets 0 to the column counter (C) and 1 to the line counter (R) (FIG. 10, Step S1).

The display luminescence control means 22 judges whether the data for 1 bit (that is, 1 dot on an electronic paper) obtained from the signal sending-receiving means 23 is the end data ("EOF", for example) or not. If it is determined to be the end data, the display processing is terminated (FIG. 10, Step S2 to S3 to S5 to S6). Even when the data for 1 bit is not obtained from the signal sending-receiving means 23, the display luminescence control means 22 terminates the display processing by determining that there is no serial data (FIG. 10, Step S3 to S4).

On the other hand, where the data for 1 bit is determined to not be the end data, the display luminescence control means 22 adds "1" to the column counter (C) and then judges whether the column counter (C) is less than the maximum column number Cmax or not (FIG. 10, Step S7 to S8). In result, if it is determined to be less than the maximum column number Cmax, the processing for displaying the pixel specified by the current line counter (R) and column counter (C) is executed based on the data content for 1 bit (black or white) (FIG. 10, Step S8: Yes to Step S9).

For instance, where both the current line counter (R) and column counter (C) are "1" and the data for 1 bit is "00", for example, the display luminescence control means 22 gives to the display driver 12a the display data comprising the address data [1,1] and ON meaning the instruction to impress the positive voltage as specific bits of data (8 bits, for example). Thereby, the display driver 12a decodes the display data and impresses the positive voltage on the line electrode $A_5$ and the column electrode $A_2$ corresponding to the address data [1,1] (more properly, impresses the positive voltage on the line electrode $A_5$ through a line wiring $L_1$ and on the column electrode $A_2$ through a column wiring $L_2$). Therefore, the pixel specified by the address data [1,1] (which will be called "pixel [1,1]" hereafter) gets to be displayed in black.

On the other hand, where the data for 1 bit is "01", for example, the display luminescence control means 22 sets OFF to the display data, said OFF means the instruction to impress the reverse voltage. Thereby, the display driver 12a impresses the reverse voltage on the line wiring $L_1$ and column wiring $L_2$ corresponding to the address data [1,1]. Therefore, the pixel [1,1] gets to be displayed in white.

Besides, if it is not necessary to consider the content displayed on the current display layer A, the information to be set to the display data may be satisfied with "ON" and "OFF" as mentioned above. However, where using the digitizer executes the processing of writing additional matters into the display layer A or correcting the content written in advance, (said processing will be described later), there is no need to have access to pixels not to be corrected (which means it is not necessary to impress the positive voltage nor the reverse voltage). In this case, the display data of the pixel not to have access is set to a code ("10", for example) meaning NON in order not to activate the display driver 12a.

By the repetition of the above processing, at the time of terminating the displaying of pixels [1,2], [1,3], . . . [1, Cmax] on the first line (that is to say, when the column counter (C) is over the Cmax), the display luminescence control means 22 adds "1" to the line counter (R) (FIG. 10, Step S8: No to Step S10). Besides, those display data of pixels [1,2], [1,3], . . . [1, Cmax] on the first line are gives in serial to the display driver 12a following to the display data of the pixel [1,1].

The display luminescence control means 22, as long as the line counter (R) added as above is the maximum line number Rmax and below, executes the processing for displaying the pixels of line specified by the line counter (R) (FIG. 10, Step S11: Yes to S13 to S15 to S2). And when the line counter (R) is over the maximum line number Rmax, the display luminescence control means 22 executes the processing of turning a new page (FIG. 10, Step S11: No to S12). Besides, in case of the new page, the line counter (R) and column counter (C) are initialized (FIG. 10, Step S14).

According to such display control, even where a great deal of the display data, which is impossible to be accommodated in one page, is received from the signal sending-receiving means 23, it is possible to display those data smoothly.

Besides, the invention in this embodiment is based on the assumption that the display data received from the signal sending-receiving means 23 is the binary dot data. However, if said data is the other type like the ASCII format or the binary format, the display luminescence control means 22 is arranged to convert the data to the dot data. As shown in FIG. 6(A), the signal sending-receiving means 23 is the means for receiving the display data, to be more precise, a driver 23a for reading a signal storage medium like the flash card or the smart media, or a connector 23b like the serial port, the parallel port, or RS-232C for inputting external signals direct to the electronic paper through the cable (or through storage means 60 for storing the data) or the like.

In the above description, the invention uses the ferroelectric high polymer liquid crystal $A_4$ as the nonvolatile display medium, and the nonvolatile display medium may be the electrophoresis microcapsule, the conductive toner or the like.

Figure 6:
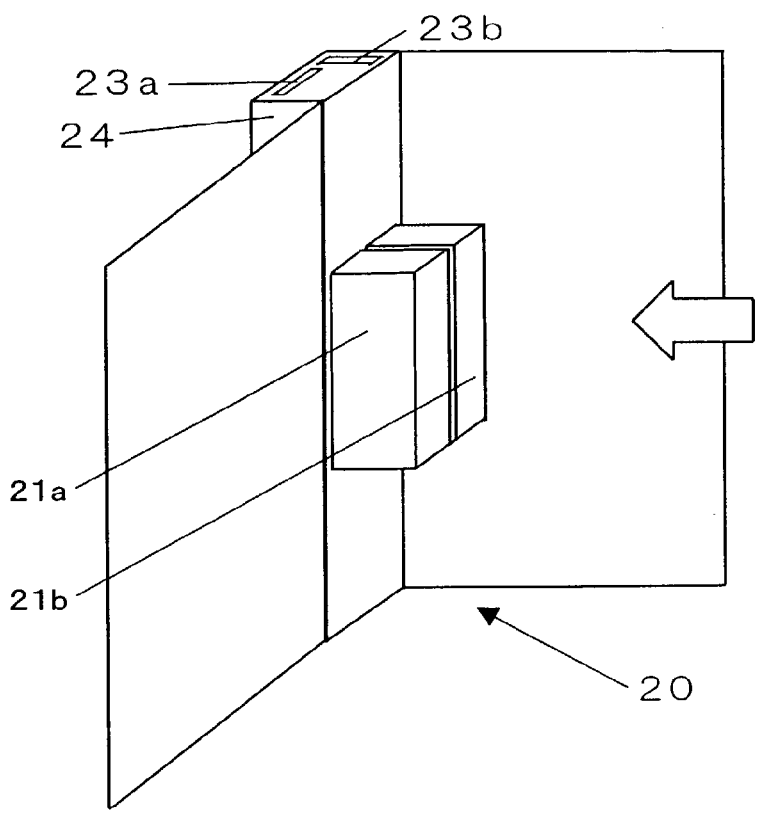
FIG. 6a is an outline view of the main unit of the electronic paper file applying the invention.
FIG. 6(b) is a front view of the electronic paper file.
Figure 6:
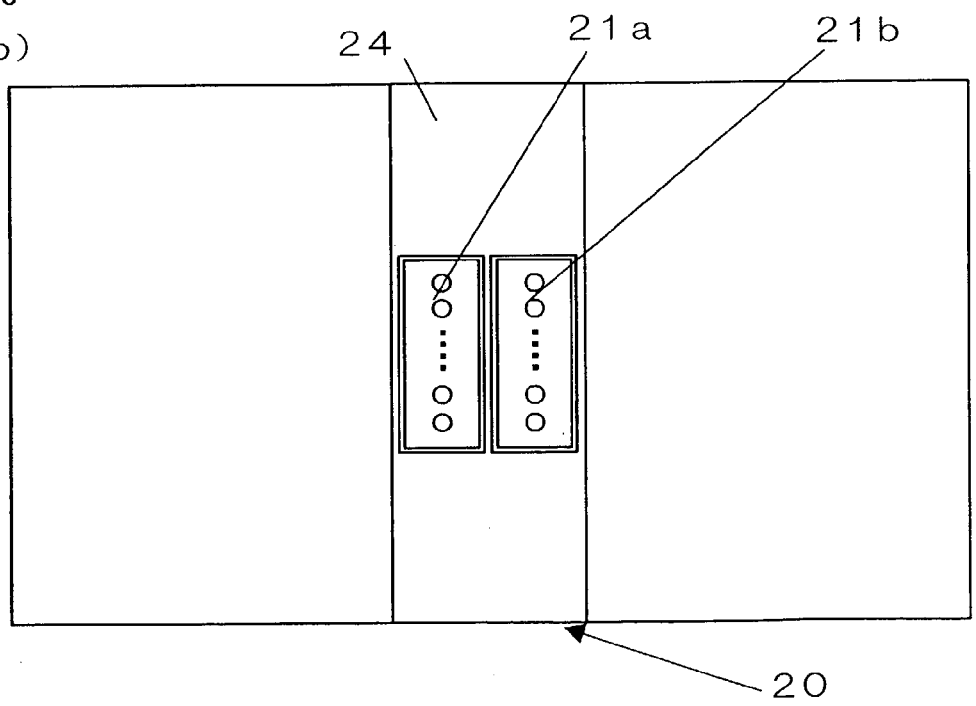
Figure 7:
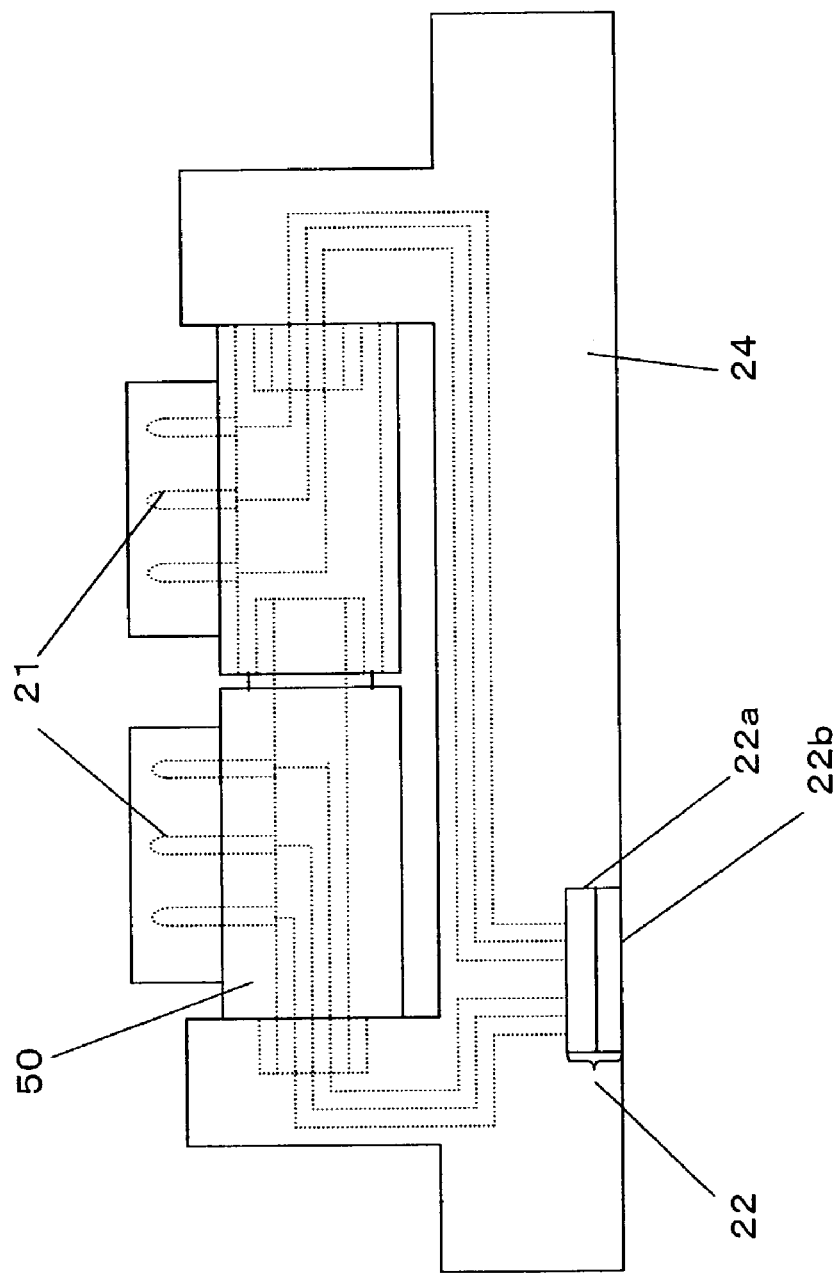
FIG. 7 is a diagram showing the display luminescence control means of the electronic paper file.

In addition, the main unit 20 may be configured to make enables to execute the abovementioned various controls, and it is not restricted to the configuration shown in FIG. 6.

Figure 8:
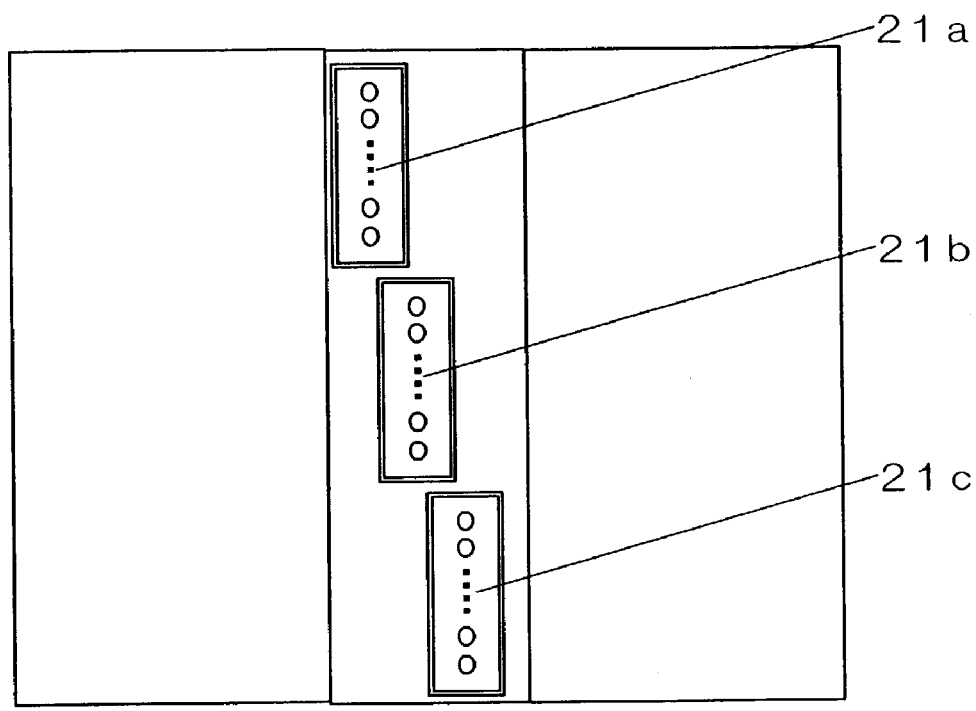
FIG. 8(a) and FIG. 8(b) are outline views of the electronic paper file adopting the overlap structure.
Figure 8:
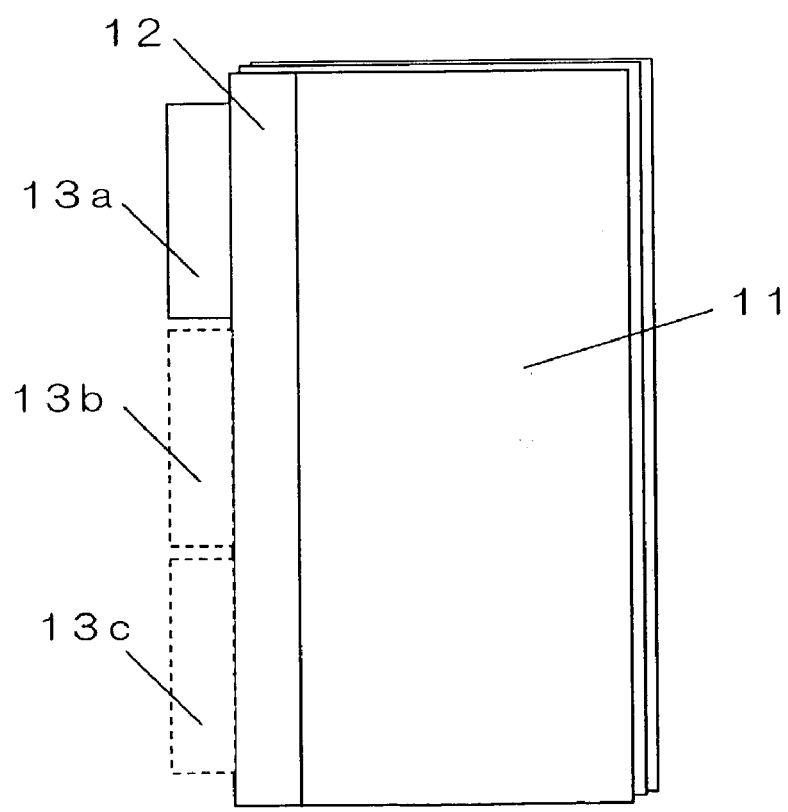

FIG. 6 shows as an example the configuration that the connecting terminals 21a and 21b corresponding to a plurality of electronic papers 10 line up sideways, but the connecting terminals 21a and 21b may overlap in the vertical direction as shown in FIG. 8(a). According to such overlapping structure, it is possible to provide more electronic papers 10. In this case, it is needless to say that the connecting terminals 13a and 13b on the side of the electronic paper 10 may be configured so as to overlap in the vertical direction, too.

By the way, the electronic paper 10 of the invention can be detached from the main unit 20. Where the data is sent to the electronic paper thus detached, the data is lost. In order to prevent the display leak of the display data, following attachment detecting means 30 may be installed in the main unit 20 so that the display data can be transferred only to the connecting terminal 21 to which the electronic paper 10 is attached.

Figure 12:
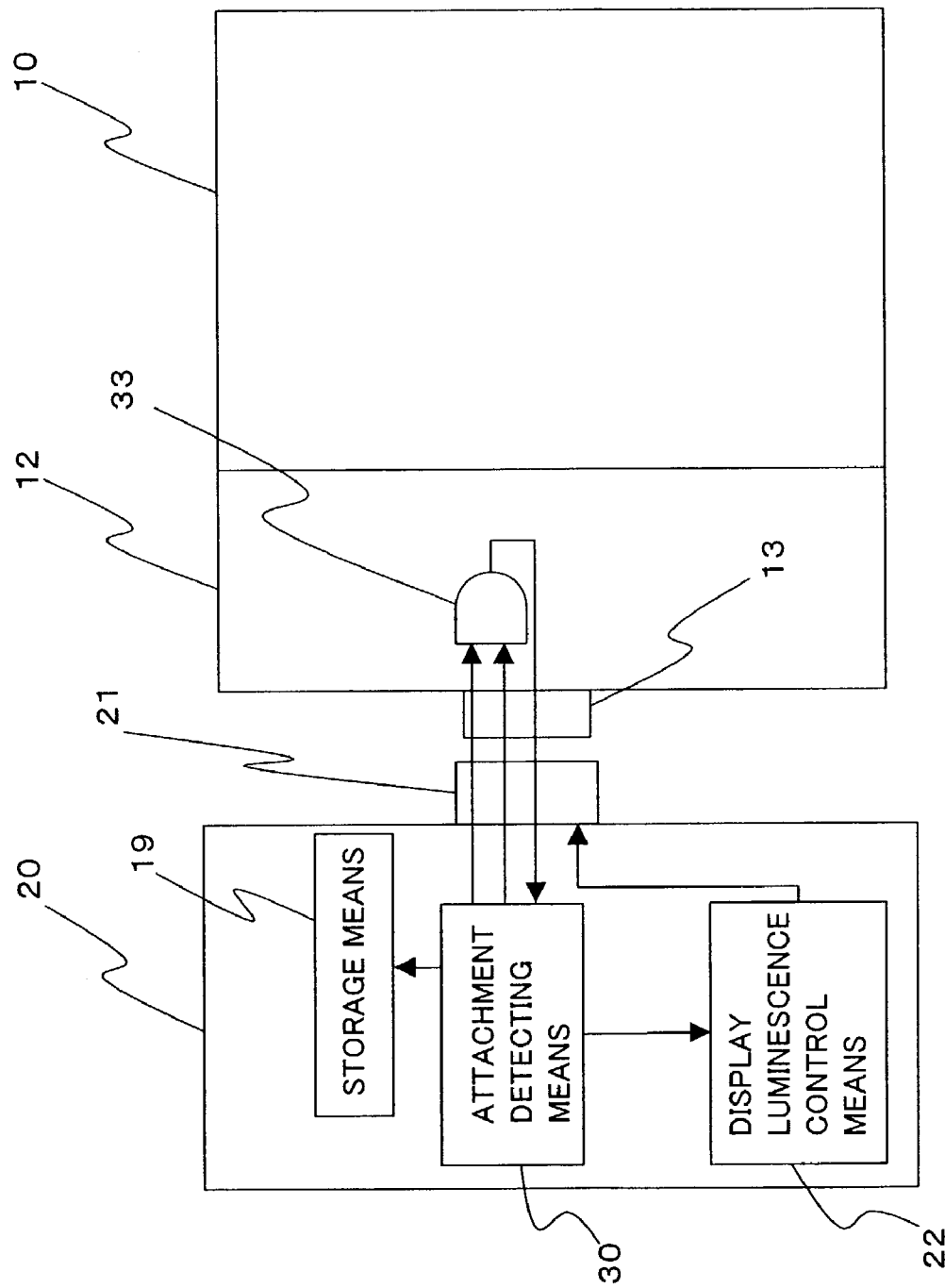
FIG. 12 is a diagram showing the method of detecting whether the electronic paper is attached to or detached from the connecting terminal of the main unit.

The connecting terminal 21 of the main unit 20, of which position is fixed, is disposed on the main body, as shown in FIG. 12. The storage means 19 stores the number of each connecting terminal 21 of the main unit (which is called a connecting terminal No. hereinafter) on the basis of the arrangement order.

Figure 16:
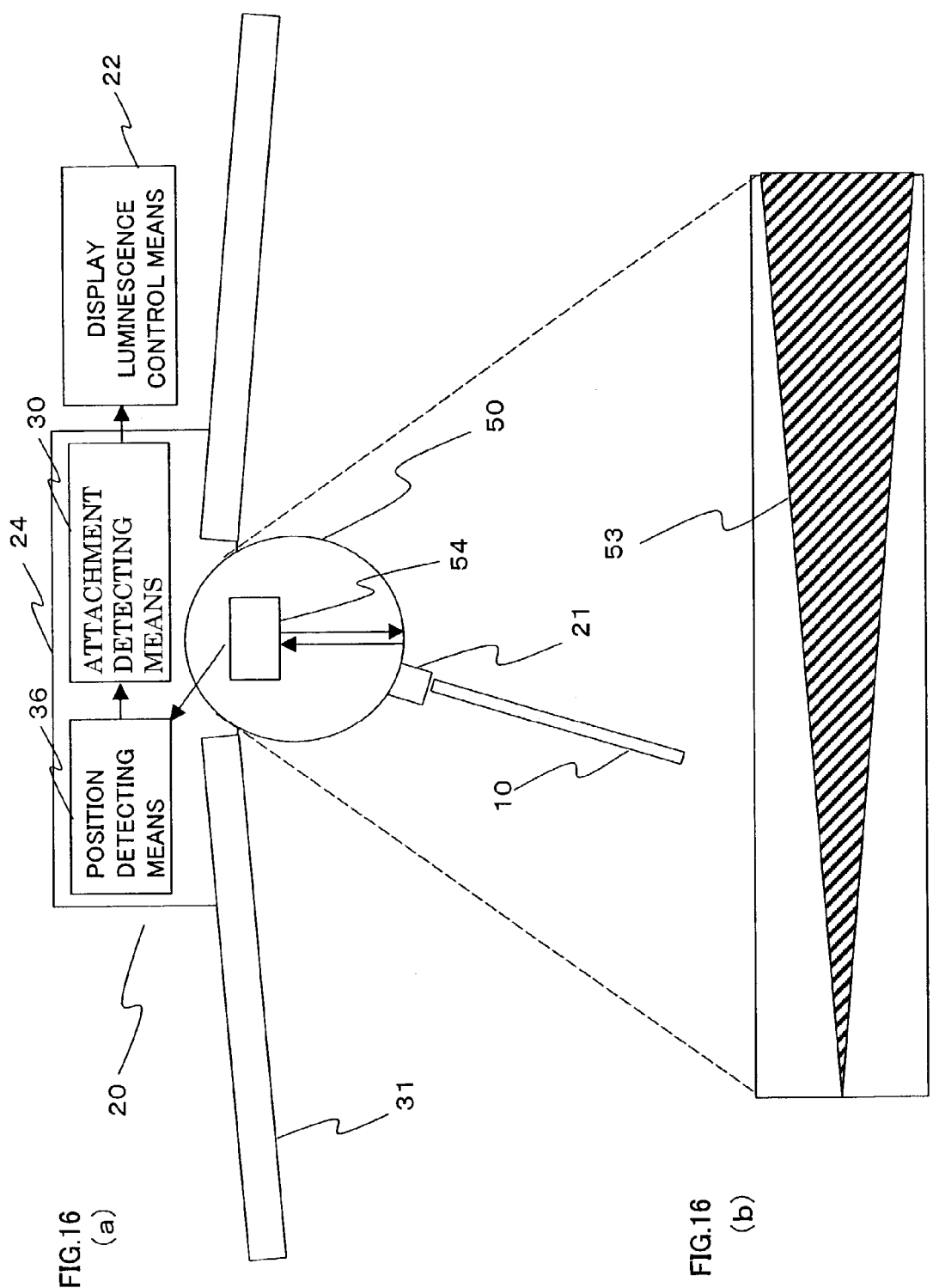
FIG. 16(a) is a view showing the method of detecting the position of the connecting terminal of the main unit.
FIG. 16(b) is a development elevation of the rotatable axis part.

Under such configuration, the attachment detecting means 30 detects the connecting terminal to which the electronic paper is attached (which will be described later), obtains the connecting terminal number of the connecting terminal 21 thus detected, and notifies the display luminescence control means 22 of said number. Besides, the connecting terminal number noted here is given as follows. The connecting terminal 21 nearest to the front board 31 (though either of the front or back board can be applied, the invention applies the front board) of the electronic paper file shown in FIG. 16 is given "1", and the following connecting terminal numbers increases as gone away from the front board 31. The storage means 19 has been installed in the main unit 20. According to this arrangement, the display luminescence control means 22 transfers the display data to the informed connecting terminal number, thereby it is possible to prevent the transfer of the display data to the connecting terminal to which the electronic paper is not connected (specifically, the display leak).

The following is an example of the configuration that the connecting terminal 21 to which the electronic paper 10 is attached is detected by the attachment detecting means 30.

For instance, the main unit 20 is provided with the attachment detecting means 30 as shown in FIG. 12, and the attachment detecting means 30 outputs two signals of "1" to each connecting terminal 21. At this time, where the electronic paper 10 is attached to the connecting terminal 21, the two "1" signals are inputted to AND gate 33 of the display driver unit 12 through the connecting terminal 13 of the electronic paper. Thereby, the AND gate 33 returns the "1" signals to the attachment detecting means 30 through the connecting terminals 13 and 21. In result, the attachment detecting means 30 detects the electronic paper 10 is attached to the connecting terminal 21 of the output end of the electric signals.

Figure 13:
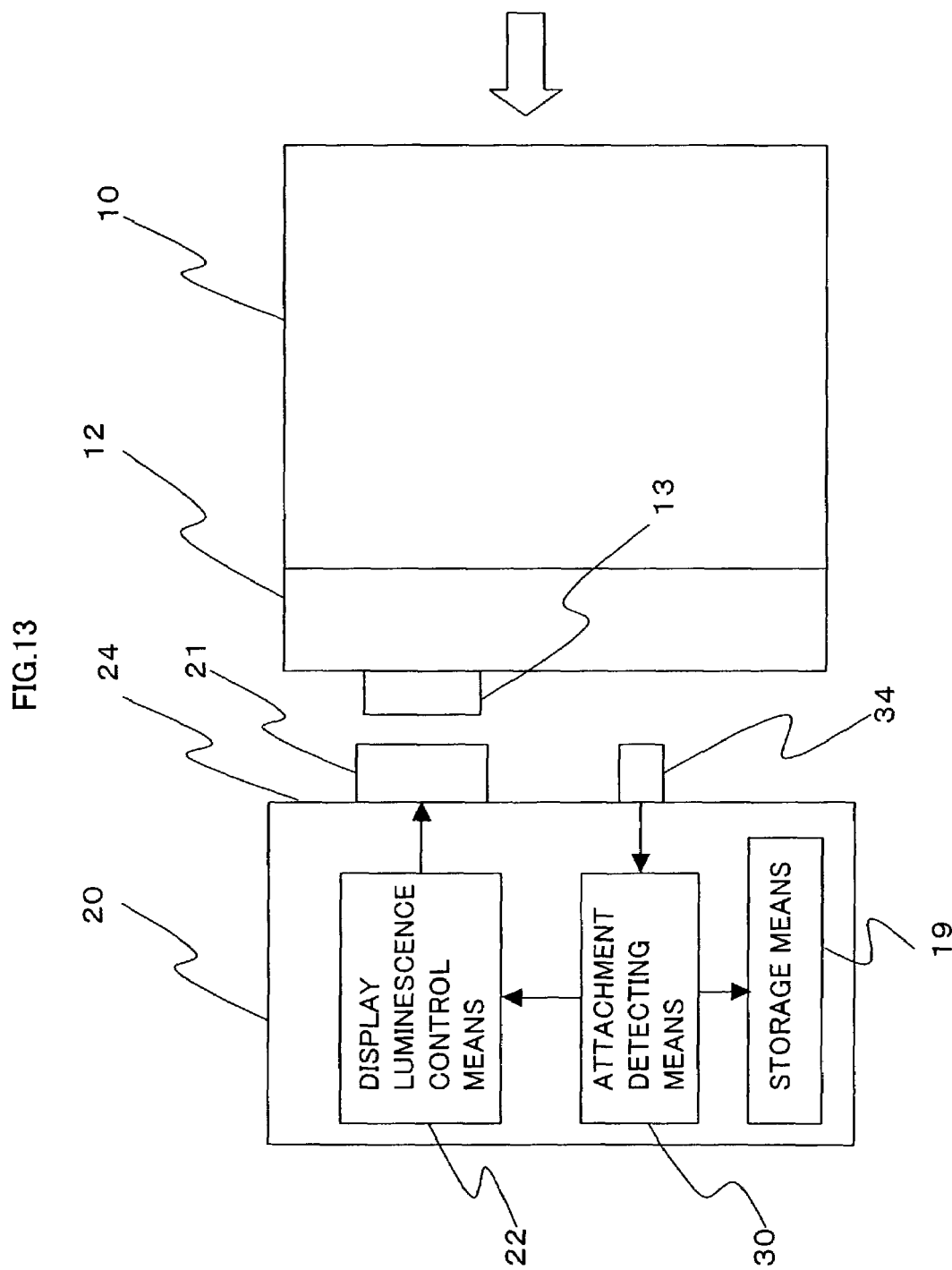
FIG. 13 is a diagram showing the method of detecting whether the electronic paper is attached to or detached from the connecting terminal of the main unit.

In addition, it may be configured that an internal surface of the spine 24 of the main unit 20 is provided with a push button 34 as shown in FIG. 13. Specifically, at the moment that the connecting terminal 13 of the electronic paper 10 is attached to the specific connecting terminal 21 of the main unit, the push button is to be pushed by the electronic paper 10. Where the push button 34 is pushed down in such way, the attachment detecting means 30 detects the electronic paper 10 is attached to the specific connecting terminal 21.

Figure 14:
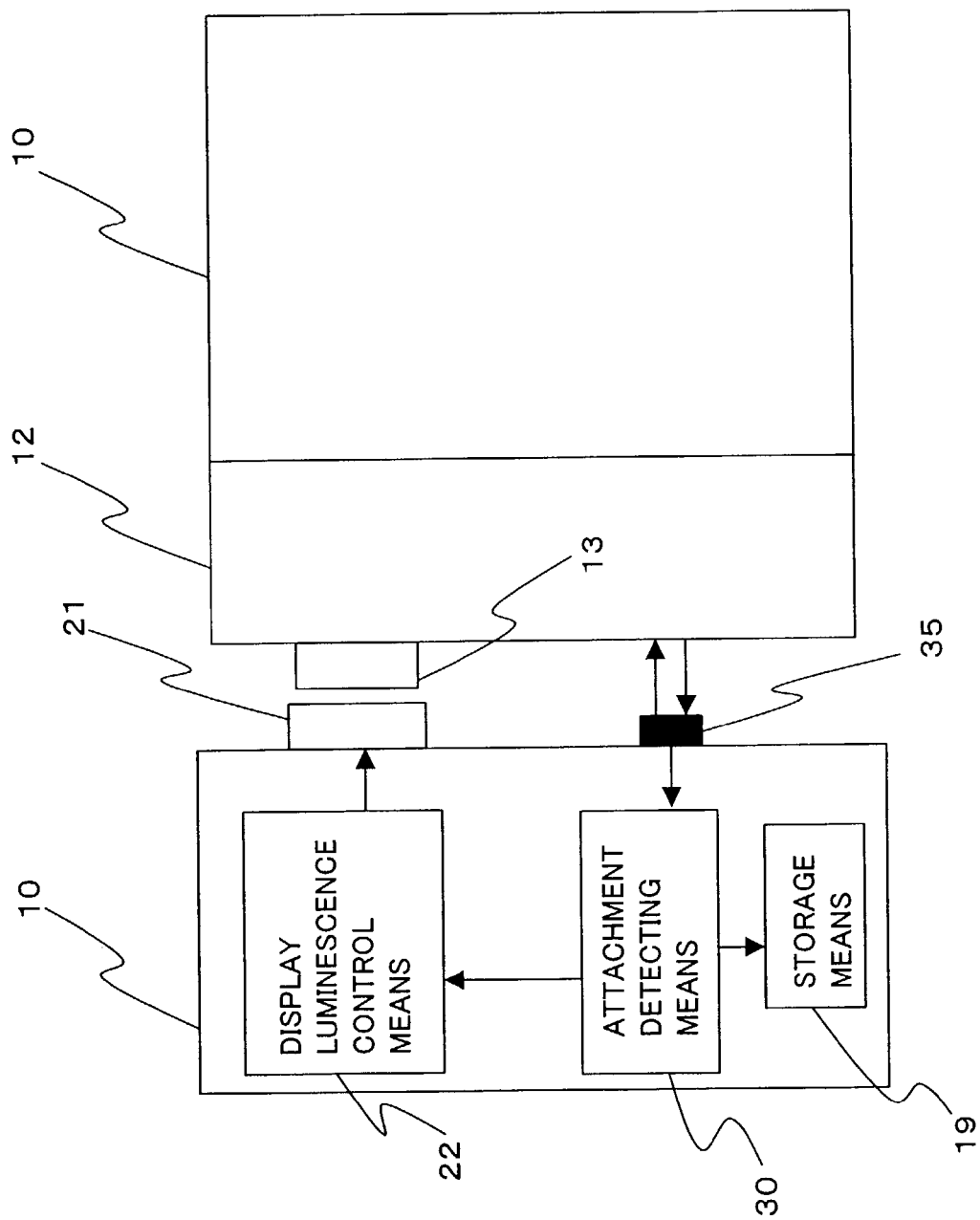
FIG. 14 is a diagram showing the method of detecting whether the electronic paper is attached to or detached from the connecting terminal of the main unit.

Likewise, it may be arranged as shown in FIG. 14 that the main unit is equipped with a photocoupler 35 for emitting light toward the projected direction of connecting terminal 21 of the main unit. And the photocoupler may be arranged so as to reflect the light when the electronic paper 10 is attached. According to the reflected light, the attachment detecting means 30 may detect whether the electronic paper 10 is attached or detached.

That is to say, where the electronic paper 10 is attached to the connecting terminal 21, the light emitted from the photocoupler 35 is reflected on the electronic paper 10. Accordingly, when the photocoupler 35 recognizes to receive the reflected light, the attachment detecting means 30 detects the electronic paper 10 is attached to the connecting terminal 21.

The above description relates the configuration as shown in FIG. 6 that the connecting terminal 21 of the main unit is placed on the spine 24 directly and both the plane and rotation positions are fixed, however, if the connecting terminal 21 can be rotated, it makes possible to facilitate the handling like the operation of turning over pages.

Figure 15:
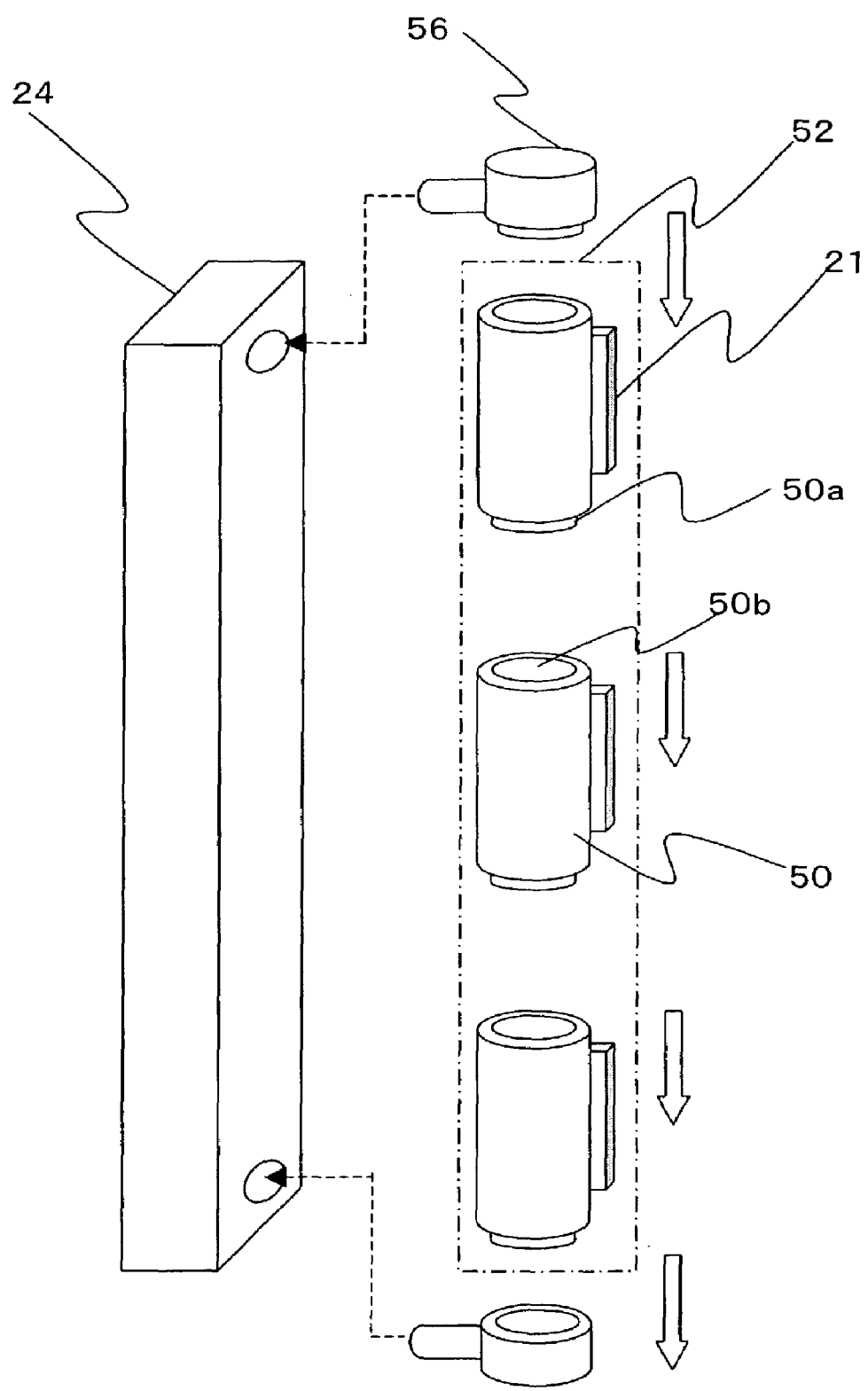
FIG. 15 is an outline view of the main unit adopting the rotation structure.

FIG. 15 shows the structure wherein the connecting terminal 21 can be rotated. As shown in FIG. 15, the upper and lower ends of a rotatable axis part 50, which is a specific length in a cylindrical shape, are provided with inserting parts 50a and 50b that can be connected mutually with the upper and lower ends of the other rotatable axis part 50. On the internal surface of the rotatable axis part 50 (or the external surface in case of the rotatable axis part made of the transparent material) as shown in FIG. 16(b), a reflecting part 53 is illustrated so that the width may increase gradually in the circumferential direction. And the axis direction of the external of the rotatable axis part 50 is provided with the connecting terminal 21 of the main unit. The rotatable axis parts 50 configured in this way are connected each other, thereby a coupling axis 52 can be formed.

Figure 17:
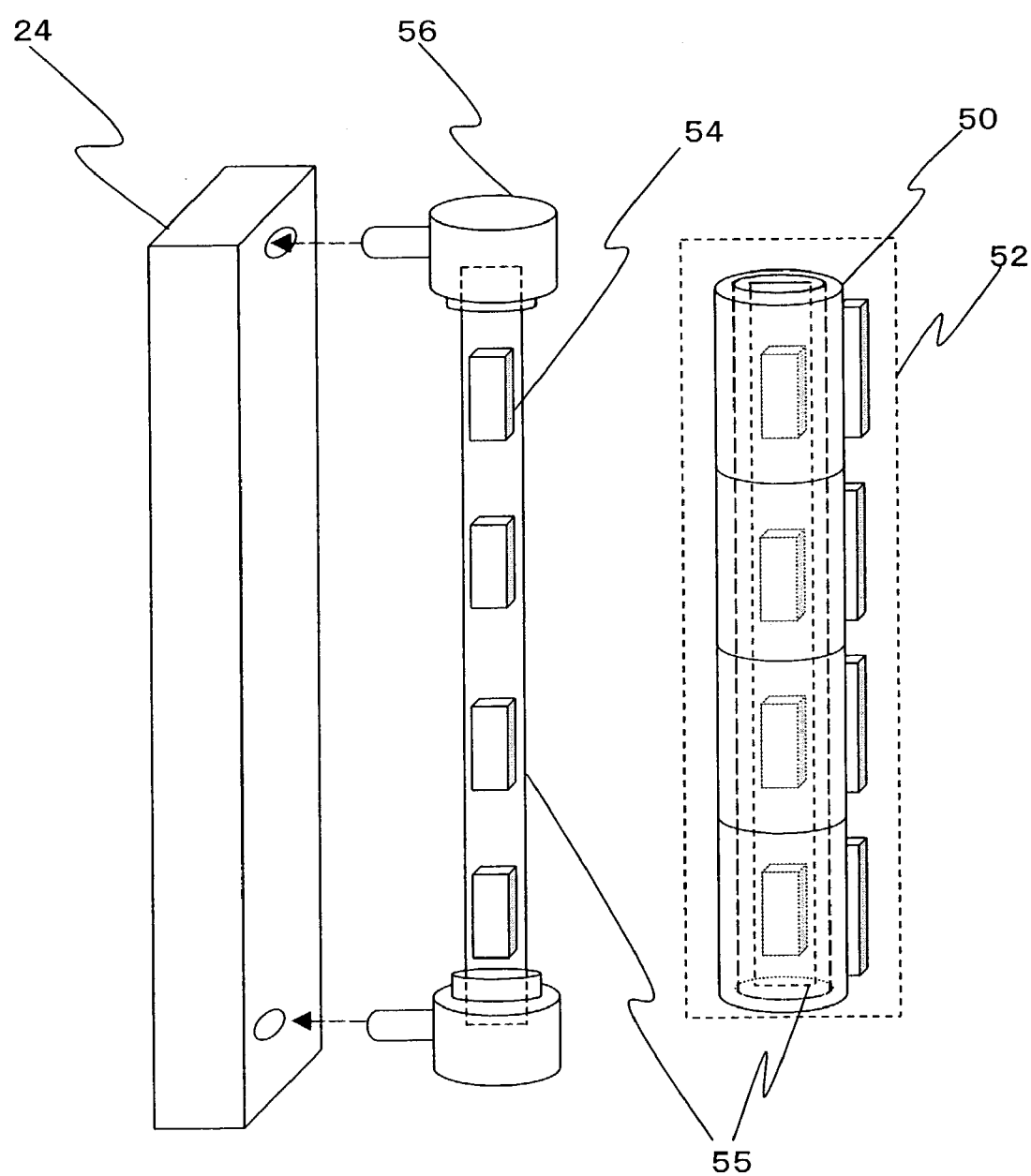
FIG. 17 is a diagram showing the configuration provided the internal surface of the coupling axis with a photocoupler.

On the other hand, the photocoupler 54 is fixed to an element fixed axis 55 in each rotatable axis part 50 at the position corresponding to the reflecting part 53 as shown in FIG. 17. The element fixed axis 55 is inserted to the copling axis 52 and fixed the both end to axis end parts 56.

This axis end part 56 is provided with the upper and lower ends of the coupling axis 52 rotatably. And the axis end part 56 is fixed to the inside of the spine 24. Various means can be considered for fixing the axis end part 56 to the inside of the spine 24 and for fixing the both ends of the element fixed axis 55 to the both ends of the axis end part 56, however, these means are not essential parts of the invention and will not be explained here.

Under the arrangement that the coupling axis 52 is set to the spine 24 as above, each photocoupler 54 is arranged to emit light in the same one direction. Where the connecting terminals 21 attached to each movable part 50 are in a same direction, the reflecting part 53 illustrated on the internal surface of each connecting terminal is arranged to indicate the same width in the axis direction along with the internal surface of the circumference. Therefore, the photocoupler 54 is to output the signals corresponding to the rotation angle of each rotatable axis 50, namely, the rotation angle of each electronic paper 10.

Figure 18:
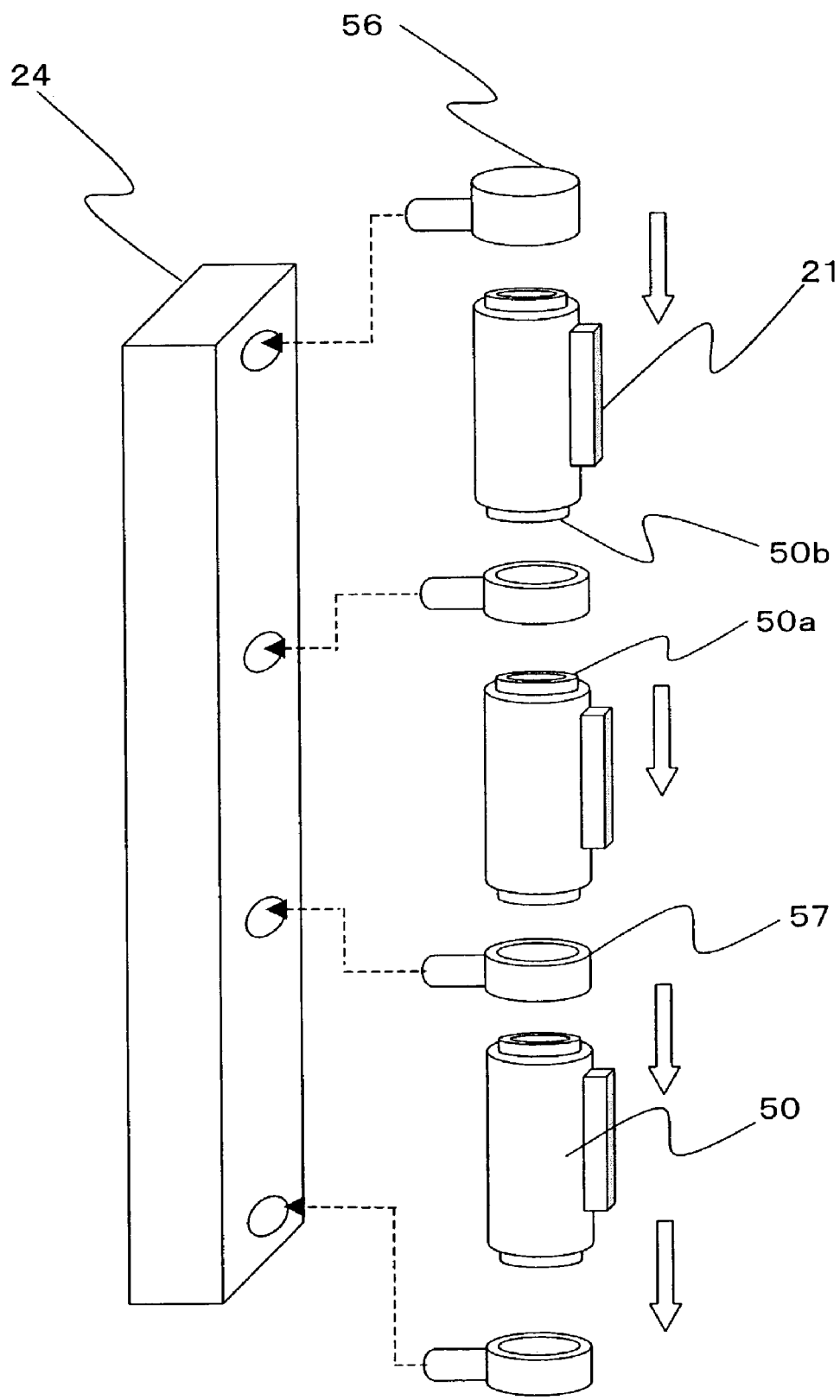
FIG. 18 is a diagram showing the utilization of an intermediate fixed part.

The above explains about the configuration that each rotatable axis 50 is connected directly each other, but it is possible to fix the coupling axis 52 to the spine 24 more stably by intervene an intermediate fixed part 57 between rotatable axis parts 50 as shown in FIG. 18.

In other words, the inserting parts 50a and 50b of each rotatable axis part are inserted into the intermediate fixed part 57 rotatably, to which each rotatable axis part 50 is jointed. Thereby the coupling axis 52 can be formed. Both ends of the coupling axis 52 configured in such way are fixed to the spine 24 by means of the axis end part 56 in the same way as above. In addition, the coupling axis 52 is also fixed to the spine 24 by means of the intermediate fixed part 57.

Figure 19:
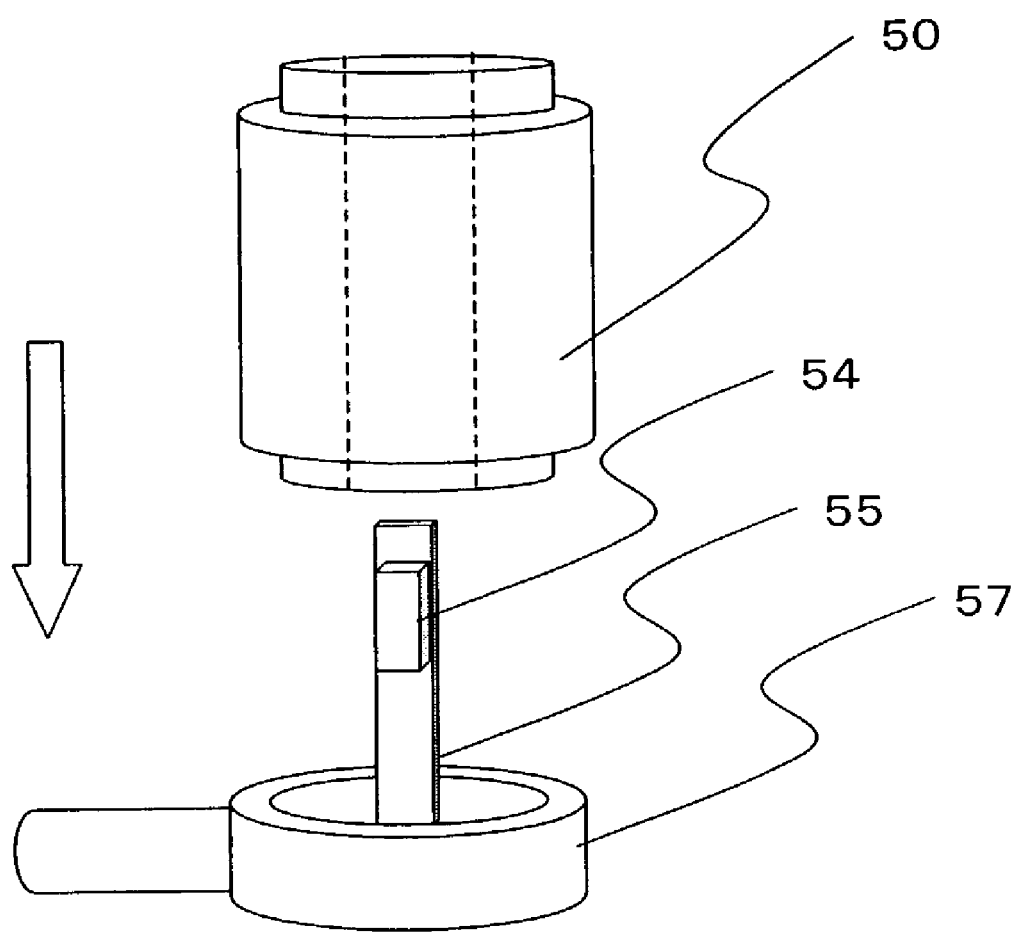
FIG. 19 is a diagram showing that the intermediate fixed part is provided with the element fixed axis.

Under thus arrangement, the element fixed axis 55 may be fixed by the axis end parts 56 of the both ends like the above example. Furthermore, it may be arranged as shown in FIG. 19 that the element fixed axis 55 for setting the photocoupler 54 may project from each intermediate fixed part 57 (or the end part 56) into the inside of each rotatable axis part 50.

Figure 20:
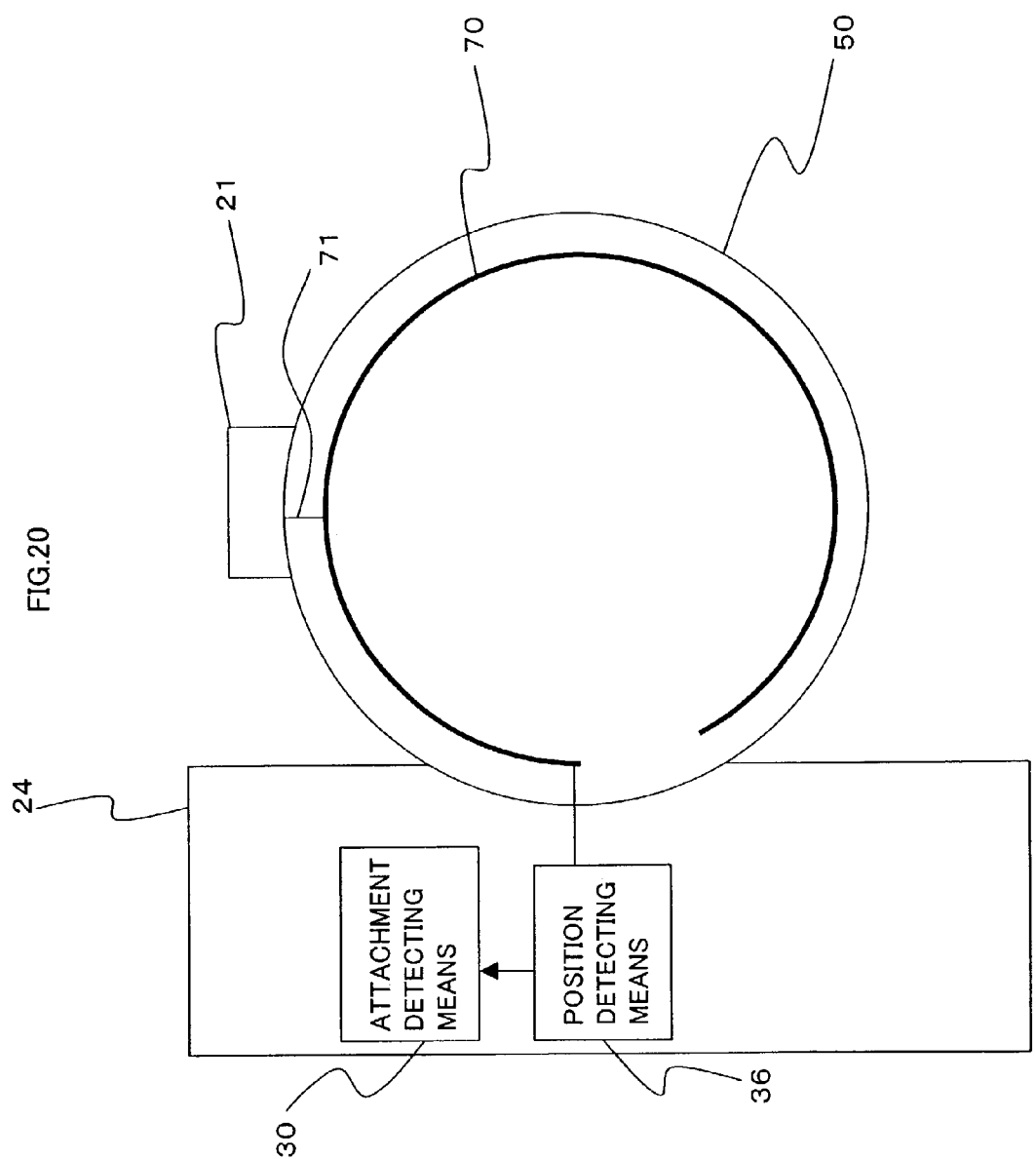
FIG. 20 is a diagram showing the method of detecting the position of the connecting terminal of the main unit.

In addition, it may be also arranged as shown in FIG. 20 that a variable resistor 70 may be used as a substitute for the photocoupler 54. That is to say, in order not to prevent the rotation of the rotatable axis part 50, the variable resistor 70 in doughnut shape is fixed to the element fixed axis 55. And the internal surface of each rotatable axis part 50 is provided with a movable terminal 71 in contact with the variable resistor 70. In this case, where each connecting terminal 21 are oriented toward a same direction, the each variable resistor 70 is to output a same value. Thereby, it is possible to obtain the rotation angle of each electronic paper.

As shown in FIG. 16(*a*) and FIG. 20, the position detecting means 36 of the main unit 20 notifies the attachment detecting means 30 of the rotation angle of each connecting terminal obtained from the photocoupler 54 or the variable resistor 70. Thereby, the attachment detecting means 30 detects the connecting terminal 21 to which the electronic paper 10 attached, and then on the basis of the above notification assigns the connecting terminal number to the detected connecting terminal 21. The connecting terminal number noted here is given as follows. The connecting terminal 21 nearest to the front board 31 of the electronic paper file is given "1", and the following connecting terminal numbers increases as gone away from the front board 31.

In the next place, the attachment detecting means 30 notifies the display luminescence control means 22 of the connecting terminal number. At receiving this notification, the display luminescence control means 22 performs the displaying as above in the order of the connecting terminal number. Therefore, the display data gets to be displayed in the order of page.

Figure 21:
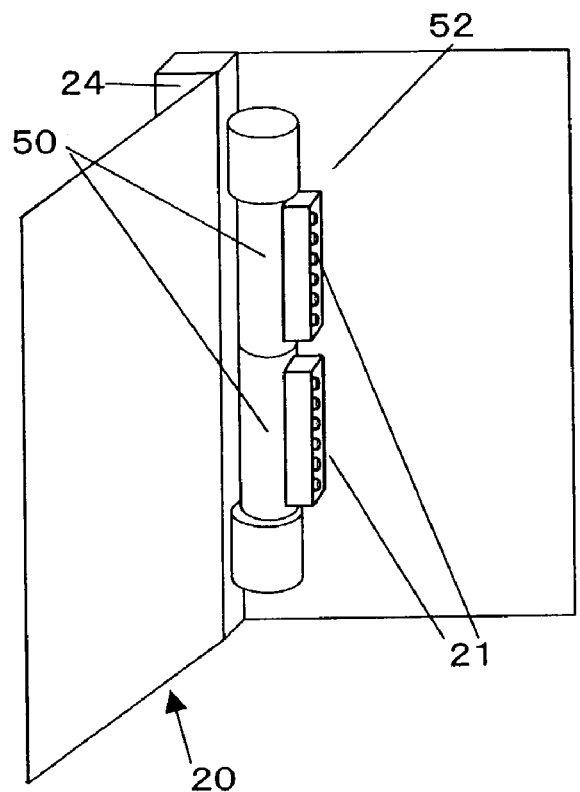
FIG. 21(a) is a diagram showing that the connecting terminal of the main unit is fitted to a different position in the longitudinal direction.
FIG. 21(b) is a front view of FIG. 21(a).
Figure 21:
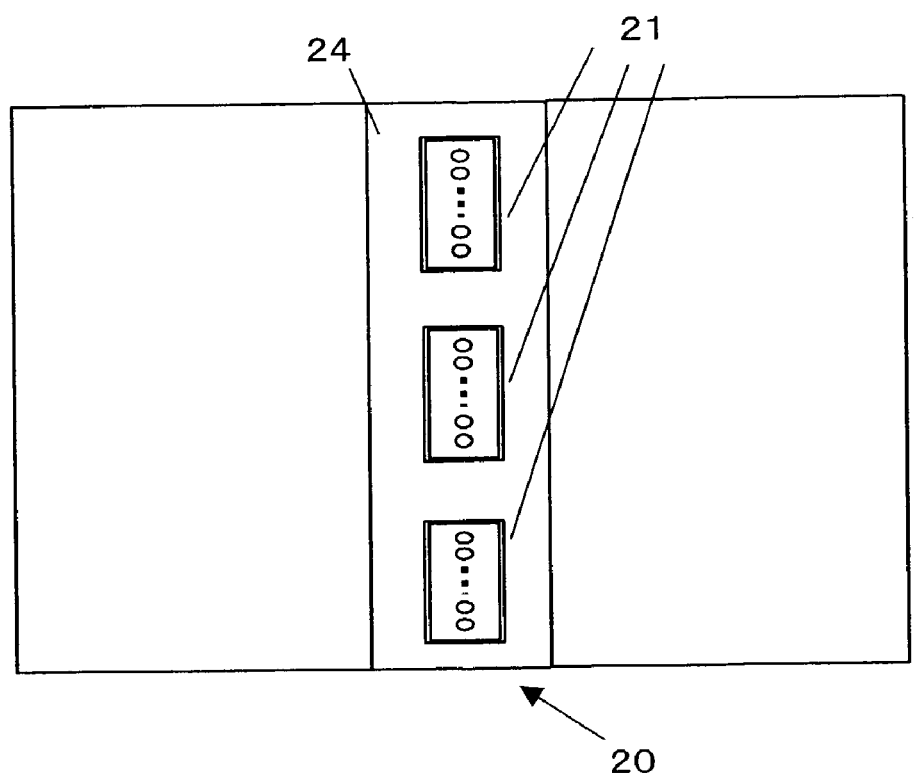

By the way, the connecting terminal 13 of the electronic paper 10 described above is fixed to a specific position of the electronic paper 10. Accordingly, the electronic paper 10 can be attached only to the connecting terminal 21 of the main unit of which position is corresponding to the connecting terminal 13. That is to say, where a plurality of connecting terminal 21 are laid at positions different each other in the vertical direction of the main unit 20 as shown in FIGS. 21(*a*) and 21(*b*), there is a problem that the electronic paper 10 must be provided with the connecting terminal 13 of which position is connectable with each connecting terminal 21 of the main unit 20. Consequently, in order to attach the electronic paper 10 to the electronic paper file independently of the position of the connecting terminal 21, the invention may adopt the following arrangement.

Figure 22:
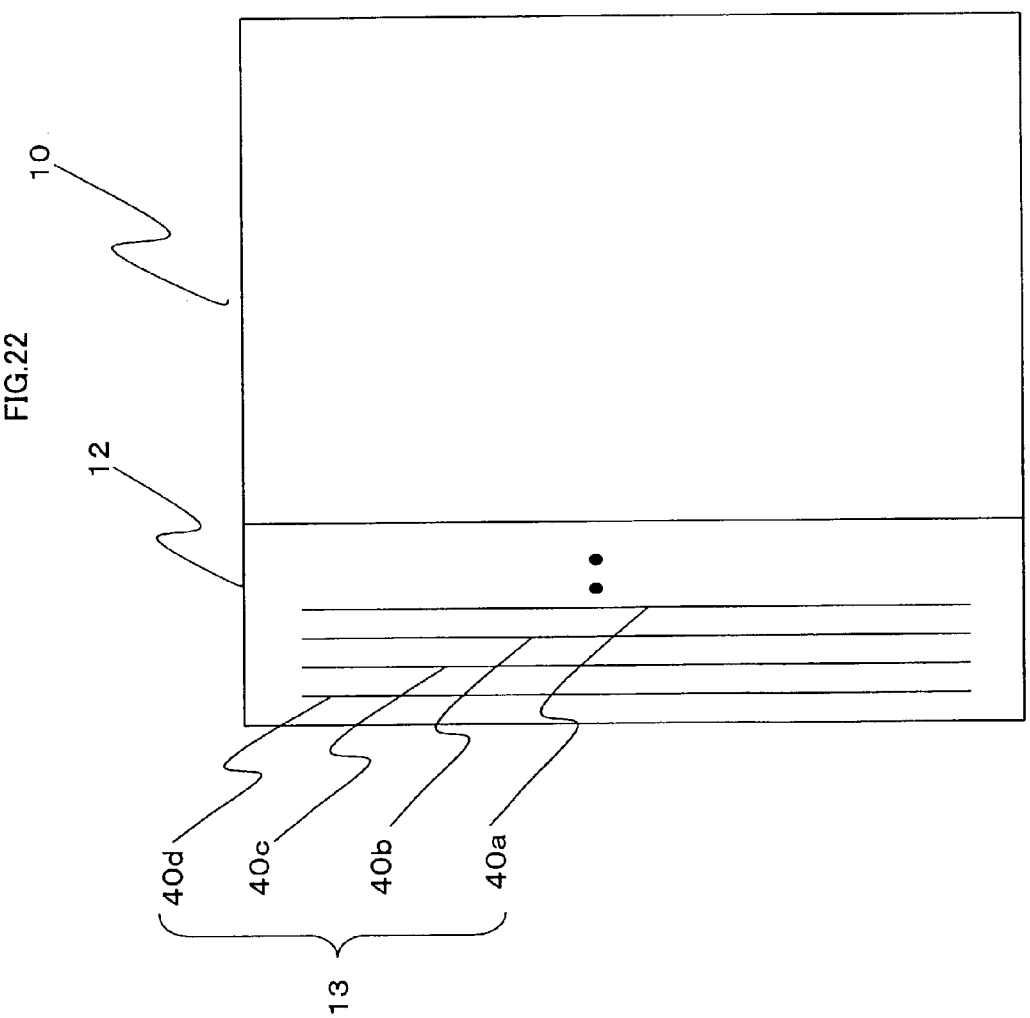
FIG. 22 is a diagram showing the shape of the connecting terminal of the electronic paper.

As shown in FIG. 22, for example, the end side of the electronic paper 10 is provide with leads 40 (40*a*, 40*b*, . . . ) as much as the number necessary for transferring the display data, which is formed in parallel each other in the vertical direction as the connecting terminal 13 of the electronic paper 10.

Figure 23:
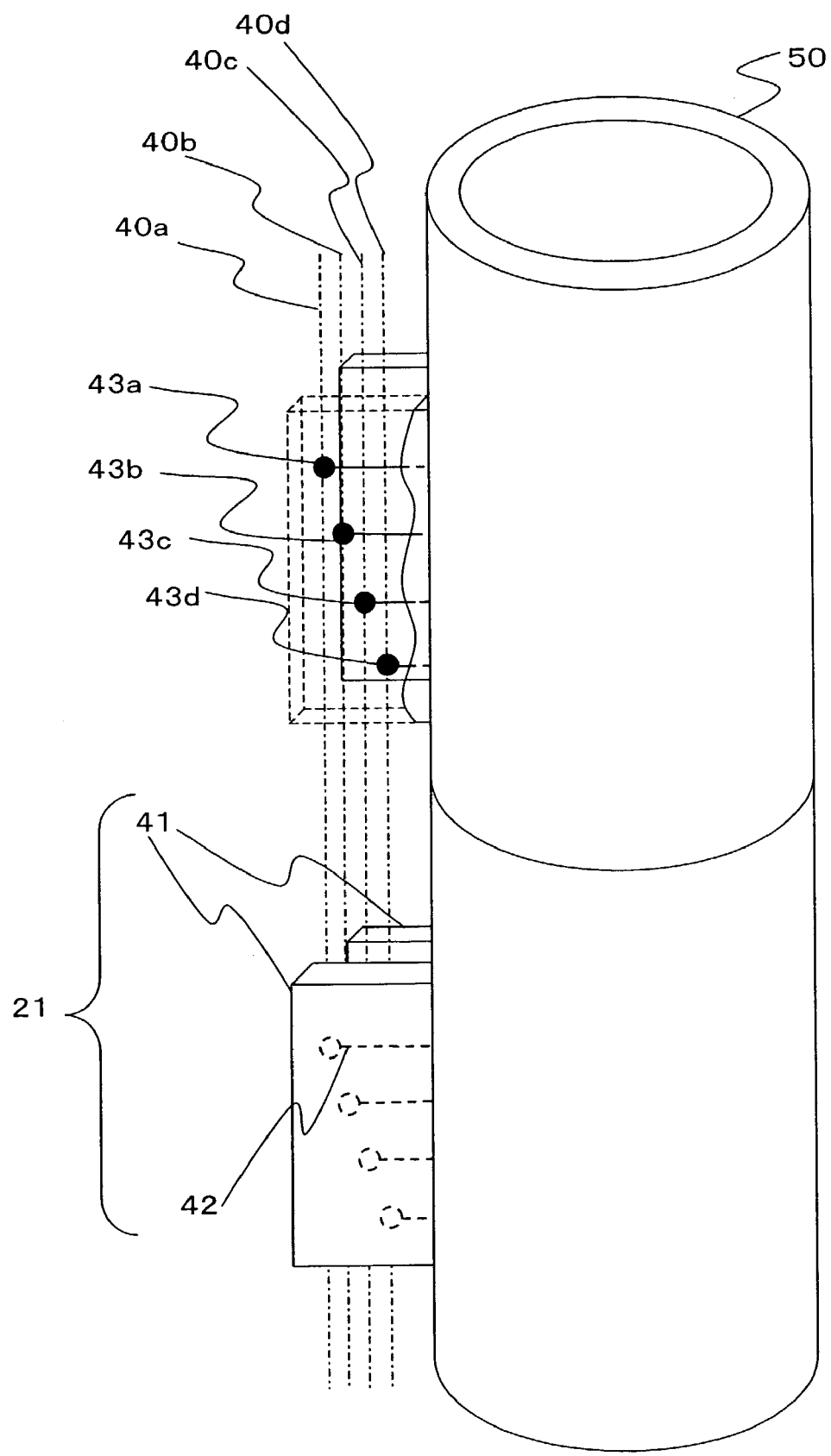
FIG. 23 is a diagram showing the shape of connecting terminal of the main unit.

On the other hand, as the connecting terminal 21 of the main unit 20, a pair of holding plates 41 may be arranged so as to project from the rotatable axis part 50 in the radial direction of the rotatable axis part 50 as shown in FIG. 23, the holding plate 41 for holding elastically the electronic paper in the direction of the thickness of the electronic paper. The internal surface of the holding plate 41 is provided with conducting leads 42 so that the top of the conducting lead may contact with each of the lead 40 provided on the electronic paper 10. The conducting lead 42 is to be conducted into the inside of the main unit.

The number of the conducting leads 42 (42*a*, 42*b*, . . . ) composing each connecting terminal 21 is as much as the number of the reads 40 of the electronic paper. The conducting lead 42 is provided with a contact point 43 of which top only can be in contact with the read 40 electrically.

In case where the connecting terminal 13 of the electronic paper is inserted between a pair of the holding plates 41 so as to hold the connecting terminal 13 of the electronic paper from the both sides, each leads 40*a*, 40*b*, . . . came in contact with each contact point 43*a*, 43*b*, . . . . Thereby, the display data transferred by the display luminescence control means 22 runs to the electronic paper through the contacting points 43*a*, 43*b*, . . . and each lead 40*a*, 40*b*, . . . .

In addition, where the display luminescence control means 22 performs the displaying on the basis of the connecting terminal number notified by the attachment detecting means 30 as above, the connecting terminal number of the connecting terminal to which the electronic paper 10 is attached may be displayed on the electronic paper. In this way, if the connecting terminal number is displayed on the electronic paper, even after this electronic paper is detached from the main unit 20, it is easy for the user to know the order of the display data displayed on the electronic paper 10 by having a look at the connecting terminal number.

In case where the display data is stored in the storage means 60 provided to the main unit 20, the following processing can be performed.

For instance, where the electronic paper 10 attached to a specific connecting terminal 21 is detached and then attached to a different connecting terminal 21, it would occur that the display data is not displayed in numerical order of pages.

Consequently, the attachment detecting means 30 has been set to always detect the attachment of the electronic paper 10. That is to say, at the time of detecting that the electronic paper 10 is attached to the connecting terminal 21 or detached from the connecting terminal 21, the attachment detecting means 30 notifies the display luminescence control means 22 of the connecting terminal number of the connecting terminal 21 to which the electronic paper 10 is attached as mentioned above. Additionally, if the main unit 20 is provided with the position detecting means 36, the position detecting means 36, in conjunction with the attachment detecting means 30, assign the connecting terminal number to the connecting terminal 21 as mentioned above, and then notifies the display luminescence control means 22 of the connecting terminal number.

In receipt of the above notification, the display luminescence control means 22 reads the display data from the storage means 60, and then performs the displaying on the basis of the notified connecting terminal number.

The above explains about the example that the main unit 20 is not provided with the storage means 60 and is provided with it. However, even in either case, the electronic paper 10 can be configured to be provided with the storage means for storing the data. In case of the configuration that the display data is stored in the storage means provided to the electronic paper 10 temporarily, the display luminescence control means 22 might be arranged to obtain the display data from the storage means and then performs the displaying as above.

Besides, the main unit 20 is provided with a specific button. The attachment detecting means 30 or the position detecting means 36 may be activated when the user pushes this button. And when the power of the electronic paper file is ON or when the display of the electronic paper is cleared temporarily, the attachment detecting means 30 or the position detecting means 36 may be activated automatically.

Moreover, the display data contains the luminescence control data. On the basis of the luminescence control data, the display luminescence control means 22 or the luminescence control means 22b is to perform the luminescence control.

Furthermore, the electronic paper 10 may be connected with the main unit 20 electrically. As the connecting method, the wireless (IRDA, etc) method may be applied, for example. However, in this case, the electronic paper 10 and the main unit 20 must be provided with communication means permitting the wireless connection.

As described above, the embodiment of the invention can allow the electronic paper to be detached from the main unit and to retain the display content. And according to the configuration provided with the luminescence layer, it is possible to confirm the display content of the electronic paper even in the dark.

In addition, the invention uses the nonvolatile display medium (the ferroelectric high polymer liquid crystal) as the display medium. Thereby it is possible to assure a superior performance of the data sending and receiving in the real-time two-way communication. And it is possible to assure the wide viewing angle more than 160 degree and the high response within several tens μsec.

If the ferroelectric high polymer liquid crystal and the organic electro luminescence are used as the display medium, the configuration of the display can be simplified. In result, there is an effect that can provide for reducing the thickness and price and saving the weight of the electronic paper.

Storing the connecting terminal number in the storage means 19 of the main unit can prevent the display leak of the display data and can display the display data in the page order of the electronic paper file.

Embodiment 2

As explained in the embodiment 1, the display luminescence control means 22 is to display the data transmitted from the external or the data stored in the storage medium. Additionally, using the following writing means makes possible that the user be free to write his desired description into the electronic paper 10 or delete his desired description from the electronic paper 10.

That is to say, as shown in FIG. 24(a) and FIG. 24(b), the column electrode $A_3$ arranged on the back of the base film $A_2$ on the front side of the electronic paper is led to the surface of a deflection plate $A_1$ through a through-hole 100 while being corresponding to each pixel. The column electrode $A_3$ led in such way is connected with an end of switch means 101 through the lead 103 (a contact electrode). And then it is led again to the backside of the base film $A_2$ from the other end of this switch means 101 through the lead 104 and the through-hole 100.

The switch means 101 is inserted between the pixels neighboring in the column direction. Therefore, when all the switch means 101 is turned ON, the contact electrode forms a primary column. When the switch means 101 is turned OFF, the contact electrode forms an electrode unique in a specific pixel. As a matter of course, a control line 104 is arranged on the deflection plate $A_1$ so that the display luminescence control means 22 can turn the group of the switch means 101 on or off according to the purpose. Besides, since the present technology enables the intervals of the through-holes 100 to be approximate 10 μm, the display processing will function well under the above configuration.

Figure 26:
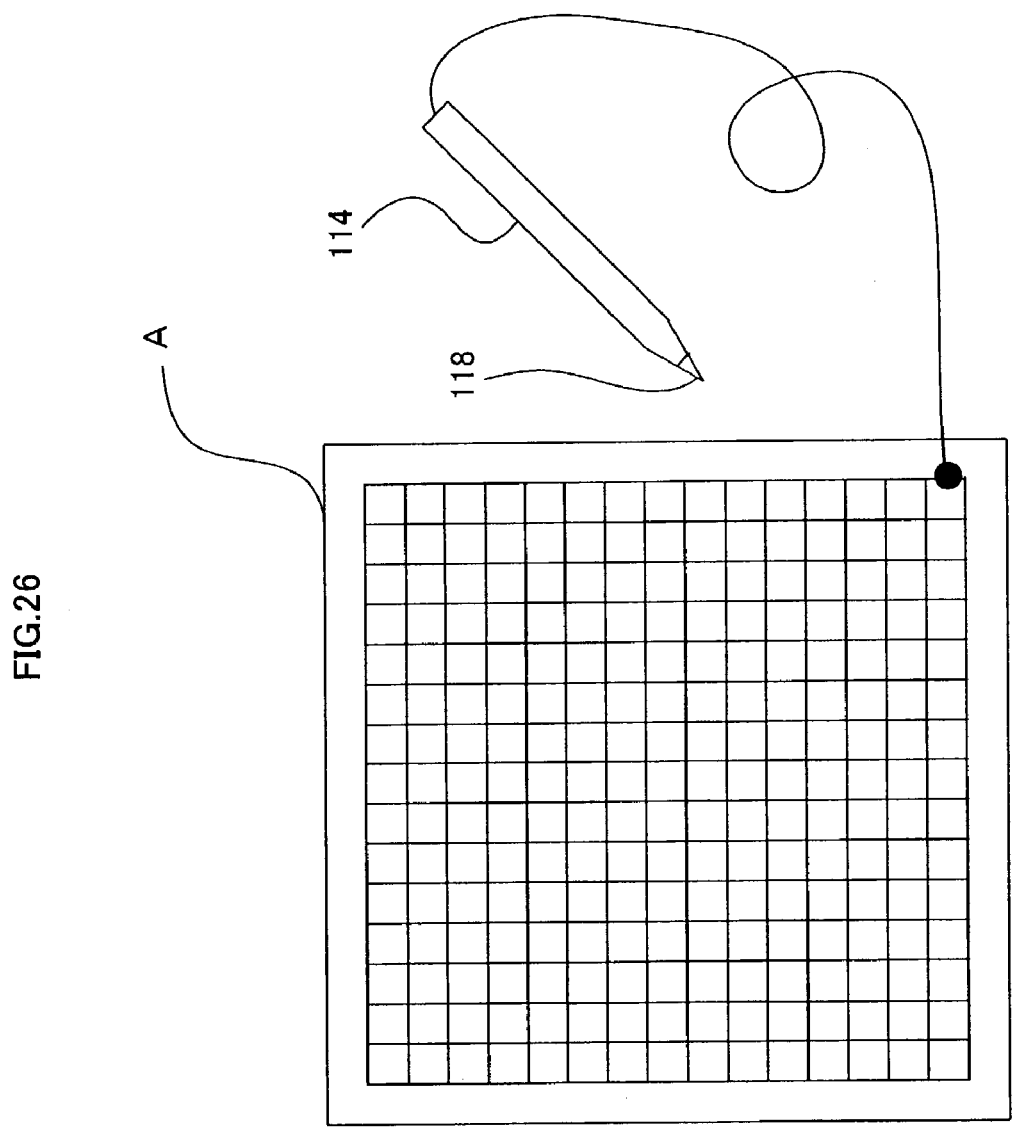
FIG. 26 is a diagram showing the connection between the electronic pen and the electronic paper in case of the direct writing.

On the other hand, as shown in FIG. 26, the lead is led from a back end of an electronic pen 114 that is provided with a contact marker 118 at the top end. The lead is connected with the line electrode A5 of the electronic paper in common. Between the contact marker 118 of the electronic pen 114 and the lead a power is installed.

Where the electronic paper 10 and the electronic pen 114 are configured as above and the user wants to display the data inputted from the external or the data stored in the storage medium 60 as explained in the embodiment 1, the group of the switch means 104 has been turned ON. On the other hand, where the user wants to write direct into the electronic paper the electronic pen 114, each switch means has been turned OFF. And then it is arranged that the top of the electronic pen 114 be in contact with the lead (the contact electrode) 103 led to the surface of the deflection plate $A_1$ as above. Thereby, the voltage is impressed between the line electrode $A_5$ forming the common electrode and the position of the common electrode $A_3$ corresponding to the lead 103 contacting with the contact marker 118 of the electronic pen 114, and then it is possible to write in the pixel. As a matter of course, the voltage reverse to the voltage at the writing should be impressed at the deletion.

The electronic pen 114 is provided with selecting means 106 at the specific position, and only by operating this selecting means 106, it is possible to select "the writing" or "the deleting" easily. The selecting means 106 is a switch or the like that enables the contact marker 118 of the electronic pen 114 to change to either of the positive or reverse voltage.

In addition, where the electronic paper 10 is provided with a switch for impressing the reverse voltage on the whole area of the display layer A of the electronic paper 10, it is possible to delete the data on the display layer A in block.

The above-mentioned configuration merely denotes a configuration wherein it is possible to direct write in or delete from the electronic paper. However, in order to reflect thus direct written or deleted state on the content stored in the storage means 60, the following processing must be taken.

Figure 25:
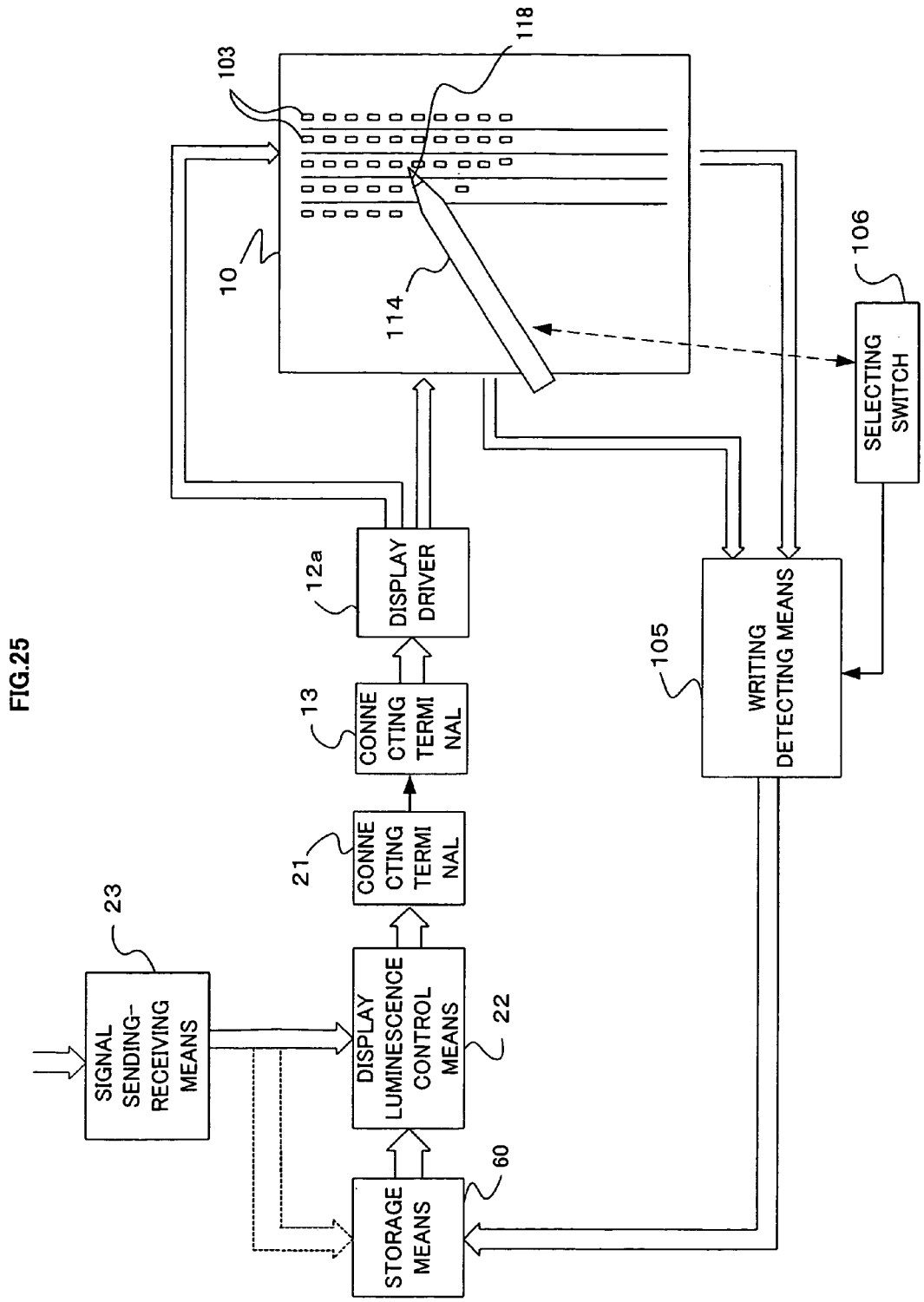
FIG. 25 is a block diagram in case of the direct rewriting.

That is to say, the connection between the lead of the electronic pen 114 and the line electrode $A_5$ is exchanged from an upper line to a lower line at a pace far speedier than the manual movement of the electric pen 114. Thereby, it must be detected every time the position with which the contact marker 118 of the electronic pen 114 is in contact. In addition, it is arranged to detect every column through the control line 104 or the other separated detecting line that the contact marker 118 of the electronic pen 114 is in contact with the lead 104 on the deflection plate $A_1$. As shown in FIG. 25, a detecting signal Sl per line and a detecting signal Sr per column are inputted into writing detecting means 105. The writing detecting means 105 detects the writing position (the deleting position), and judges based on a selecting signal from the selecting means 106 whether the instruction is the writing or the deleting. Consequently, the data to be stored in the storage means 60 is prepared, and according to thus prepared data the content of the storage means 60 is to be updated.

In the above description, the displaying of the electronic paper 10 itself is to be performed according to the voltage impressed by the electronic pen 114.

And in the above description, the display control means 22 or the storage means 60 need to recognize which electronic paper 10 is to be an object of the update. For this purpose, the control line 104 may confirm the electronic paper 10 of which switch means 101 is turned OFF.

As described above, the electronic paper of the invention enables the electronic pen of the writing means to perform the writing or the deleting directly on the nonvolatile display medium of the display layer of the electronic paper, even when the electronic paper is not connected with the power.

Embodiment 3

In the above-mentioned embodiment 2, the electronic paper is configured to be suited for performing the direct writing. The digitizer applied to the configuration of the conventional display device is fitted to the electronic paper, and the electronic paper is configured that the writing (the deleting) can be performed according to the position signal outputted from the digitizer. In result, it is possible to perform the writing or the deleting in relative easy. However, installing the digitizer in each electronic paper might increase the cost of the electronic paper. Consequently, the following configuration is possible to put the function of the digitizer to effective use.

Figure 27:
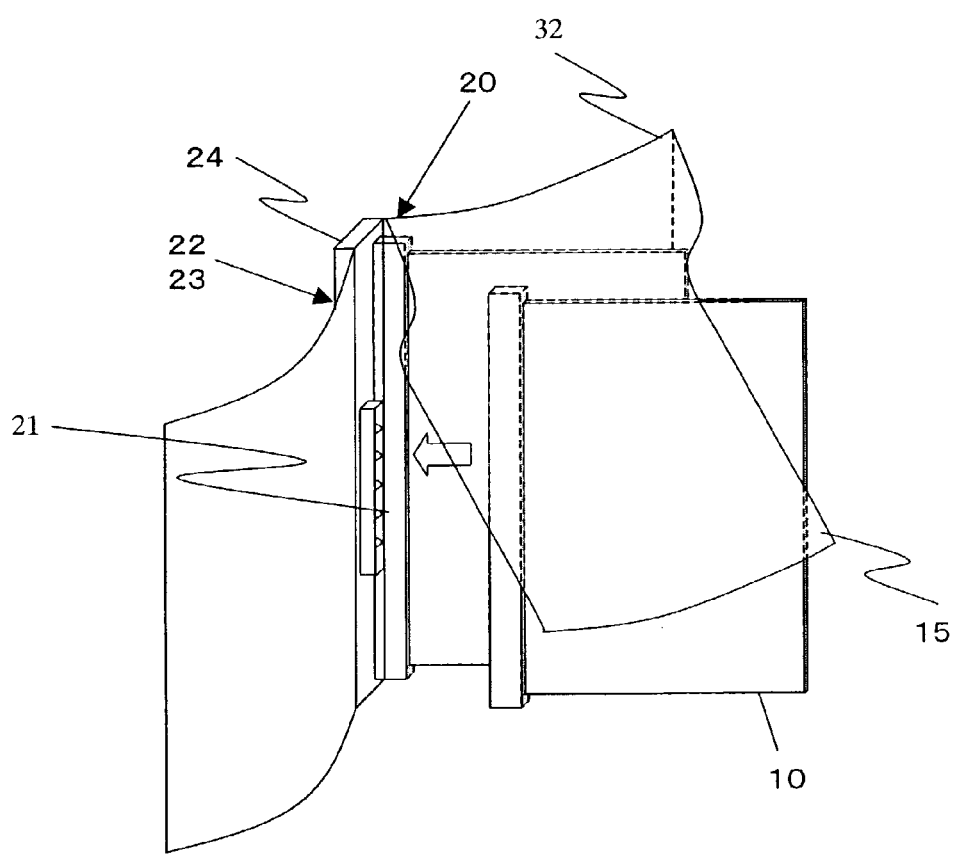
FIG. 27 is a diagram showing the connection between the electronic paper file and the digitizer.
Figure 28:
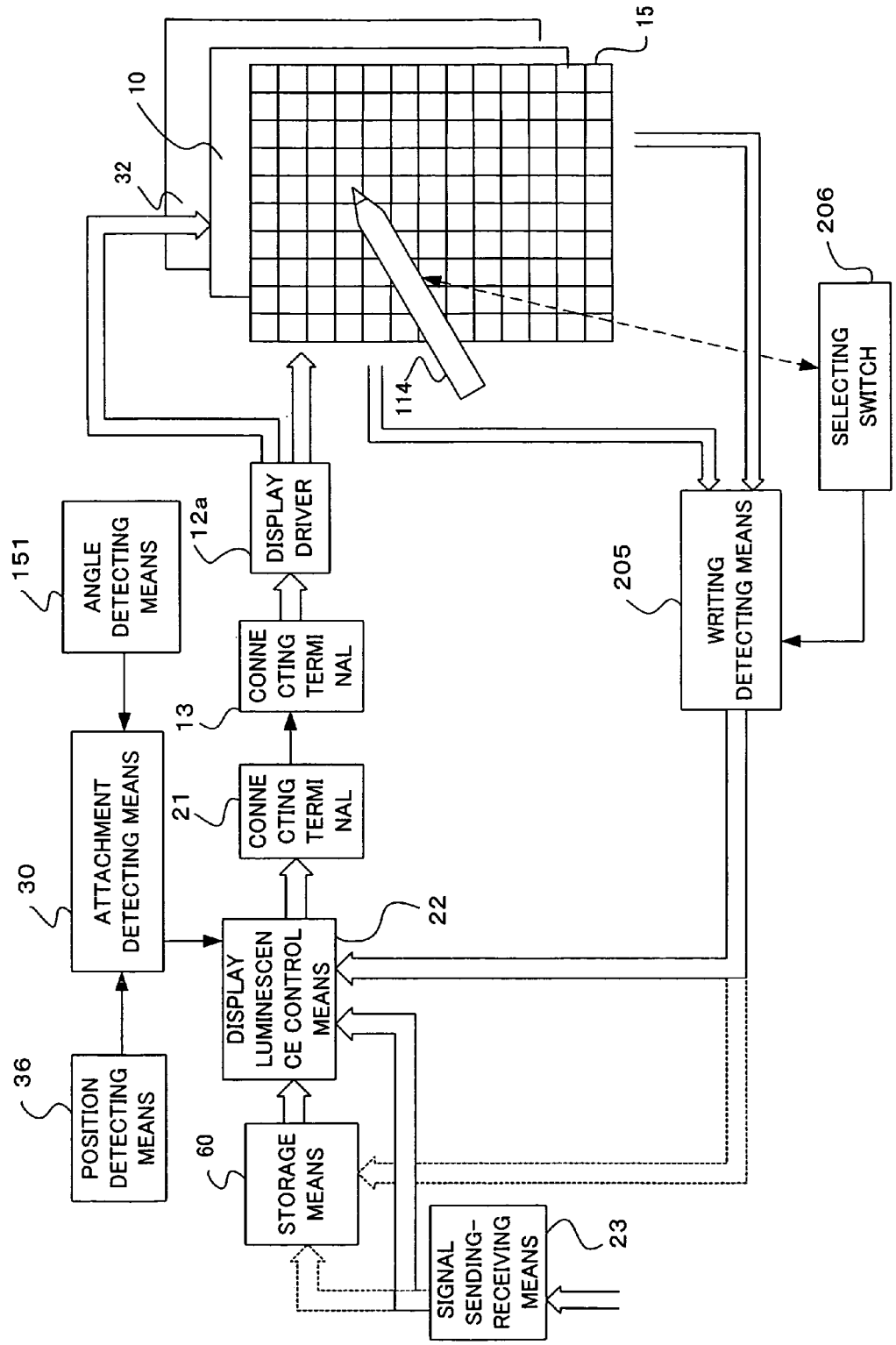
FIG. 28 is a block diagram in case of using the digitizer.

FIG. 27 is a diagram showing the configuration that the writing means comprises a sheet including the digitizer function and a writing material. FIG. 28 is the block diagram. It is arranged that the digitizer can detect the position to which the writing material contacts and the display 11 can be looked through the sheet with overlapping the sheet on the display 11.

A transparent sheet 15 including the digitizer function is arranged as shown in FIG. 27 that the upper end side is fixed to a back cover 32 of the main unit 20. The connection of the transparent sheet 15 and the main unit 20 may be the detachable type using the connecting terminal or the wireless type, instead of the above fixed type. But, in order to specify the electronic paper 10 to be an object of the writing, it is preferable to configure that the electronic paper file can detect the rotation angle (which will be described later).

In the above configuration, first the electronic paper 10 is fitted to the main unit 20, and overlapped on the back cover 32 of the main unit 20. After that, the transparent sheet 15 is placed on the electronic paper 10. In addition, where there is a plurality of electronic papers 10, the transparent sheet 15 is placed on the electronic paper 10 of the facing page.

Figure 30:
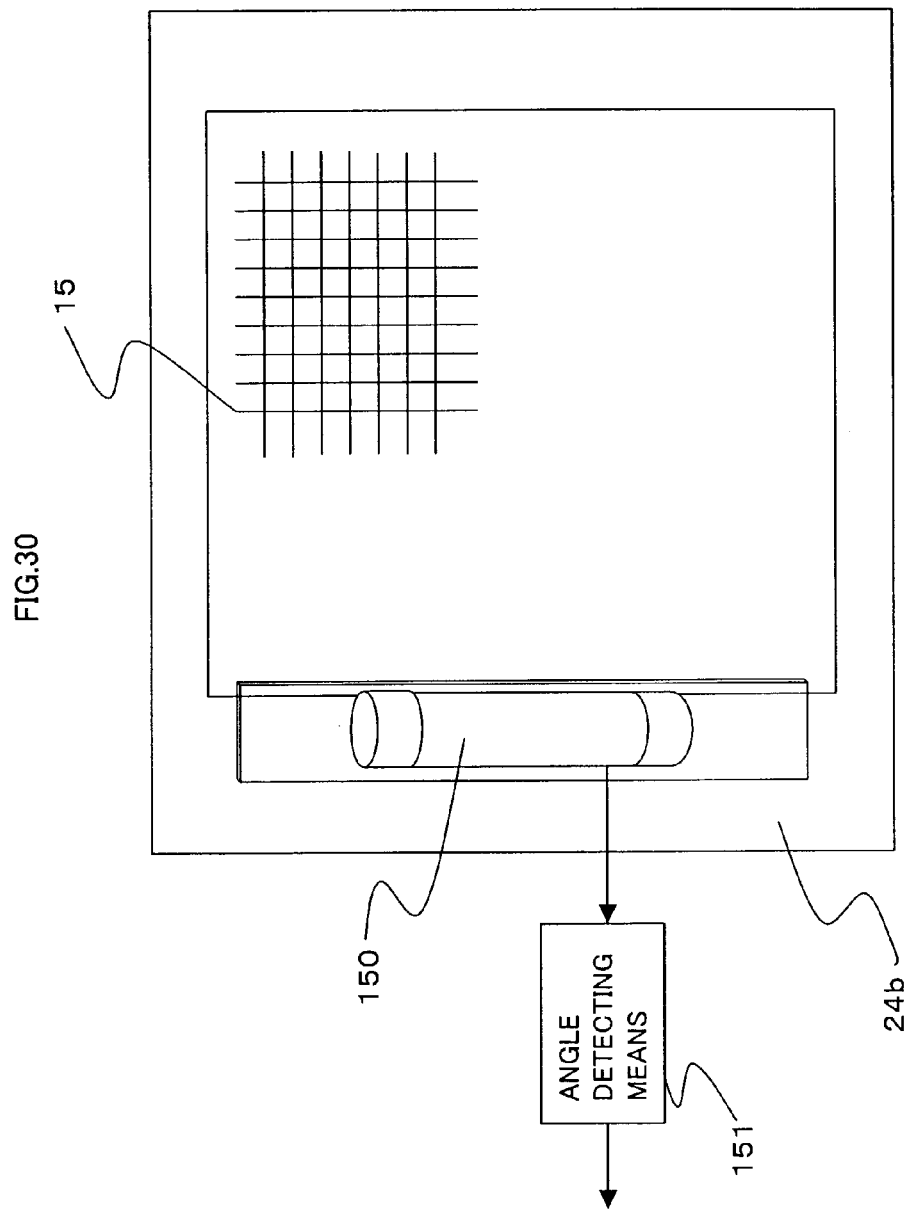
FIG. 30 is a diagram showing the configuration in case of detecting the angle by the digitizer.

At this time, the display luminescence control means 22 (in case of displaying the data stored in the storage medium 60, the storage means 60 and the display luminescence control means 22) has to recognize the electronic page the transparent page is placed on. Where the electronic paper file is provided with the position detecting means 36 for detecting the rotation angle as explained in the embodiment 1, it is possible to specify the page having the angle of almost 180 degree with the neighboring page as an object page of the writing. Additionally, under this condition, the display luminescence control means 22 could not know either a step for writing into the electronic paper by means of the transparent sheet 15 or a step for writing into the electronic paper the data sent from the signal sending-receiving means 23 (or the storage means 60). Therefore, as shown in FIG. 30 (likewise the configuration of FIG. 15 and FIG. 17), it is configured to provide the main unit 20 with the transparent sheet 15 rotatably by means of the rotatable axis 150 and the axis end part 156, and that the rotation angle of the rotatable axis 150 can be detected by angle detecting means 151. And where the angle with the facing page is not more than a specific angle (15 degree, for example), the attachment detecting means is to recognize that the transparent sheet 15 is placed on the facing page.

Where the attachment detecting means 30 knows the order of the connecting terminal 21 as shown in FIGS. 16 and 20, according to this order it is possible to know the sheet on which the transparent sheet is placed.

Figure 29:
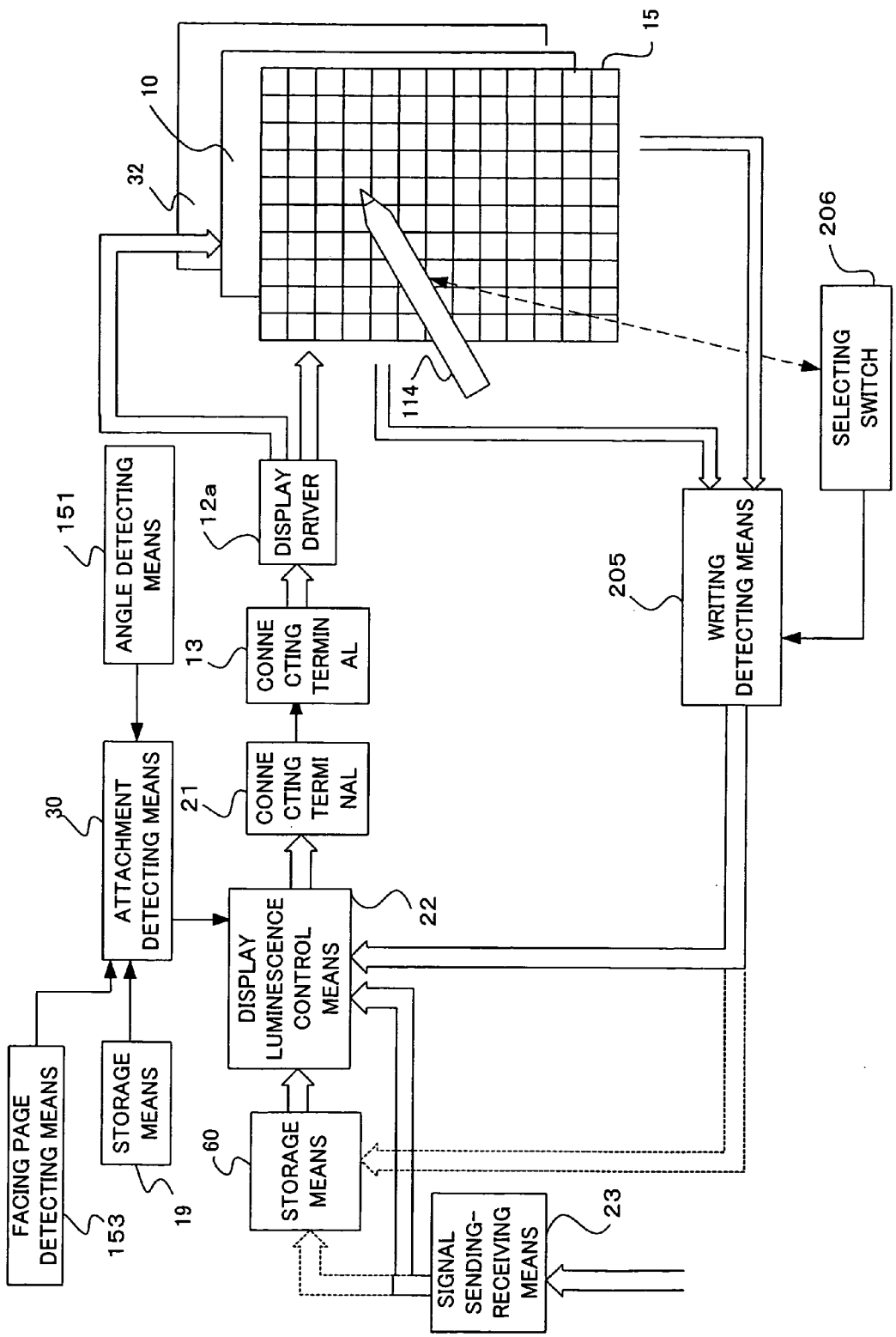
FIG. 29 is the other block diagram in case of using the digitizer.

On the other hand, when the connecting terminal 21 is fixed to the main unit 20, facing page detecting means 153 is required, as shown in FIG. 29, in order to detect whether the each page are contacted or separated. According to the facing page detected by the facing page detecting means 153, the arrangement order of the connecting terminal 21 stored in the storage means 19 and the output of the angle detecting means 151, it is possible to detect the page that the digitizer 15 is placed on.

Under such configuration, when the writing material contacts with the transparent sheet 15, the transparent sheet 15 transfers the position information corresponding to the contact position toward the writing detecting means 205. According to the position information together with the information for determining the writing or the deleting sent from the selecting switch 206 fitted to the writing material, the writing detecting means 205 prepares the corresponding display data and gives it to the display luminescence control means 22. Thereby, the display luminescence control means 22 is to transfer the signal from the writing detecting means 205 toward the electronic paper 10.

In case of displaying the data stored in the storage means 60, the data transmitted from the writing detecting means 205 is also transmitted to the storage means 60. Thereby, the content stored in the storage means is to be updated.

As described above, the electronic paper in this embodiment of the invention can perform the partial writing and deleting by means of the writing means comprising the transparent sheet including the digitizer function and the control means of the electronic paper file. In addition, even when a plurality of electronic papers is attached to the electronic paper file, it is possible to perform the partial writing into and deleting from the specific paper file.

Besides, the transparent sheet 15 may be fitted to the front cover of the main unit 20, or to both the front and back covers. And while keeping the connection of the transparent sheet 15 and the display luminescence control means 22, the transparent sheet 15 itself may be free to be fitted to the main unit 20 or the electronic paper 10 mutually, otherwise, may be placed on the electronic paper 10 only when needed. In addition, it may be configured that the transparent sheet 15 be pasted on the electronic paper 10.

Embodiment 4

The characters and graphics illustrated physically on the surface of the electronic paper with the writing material can be written into the electronic paper by using a scanner.

Figure 31:
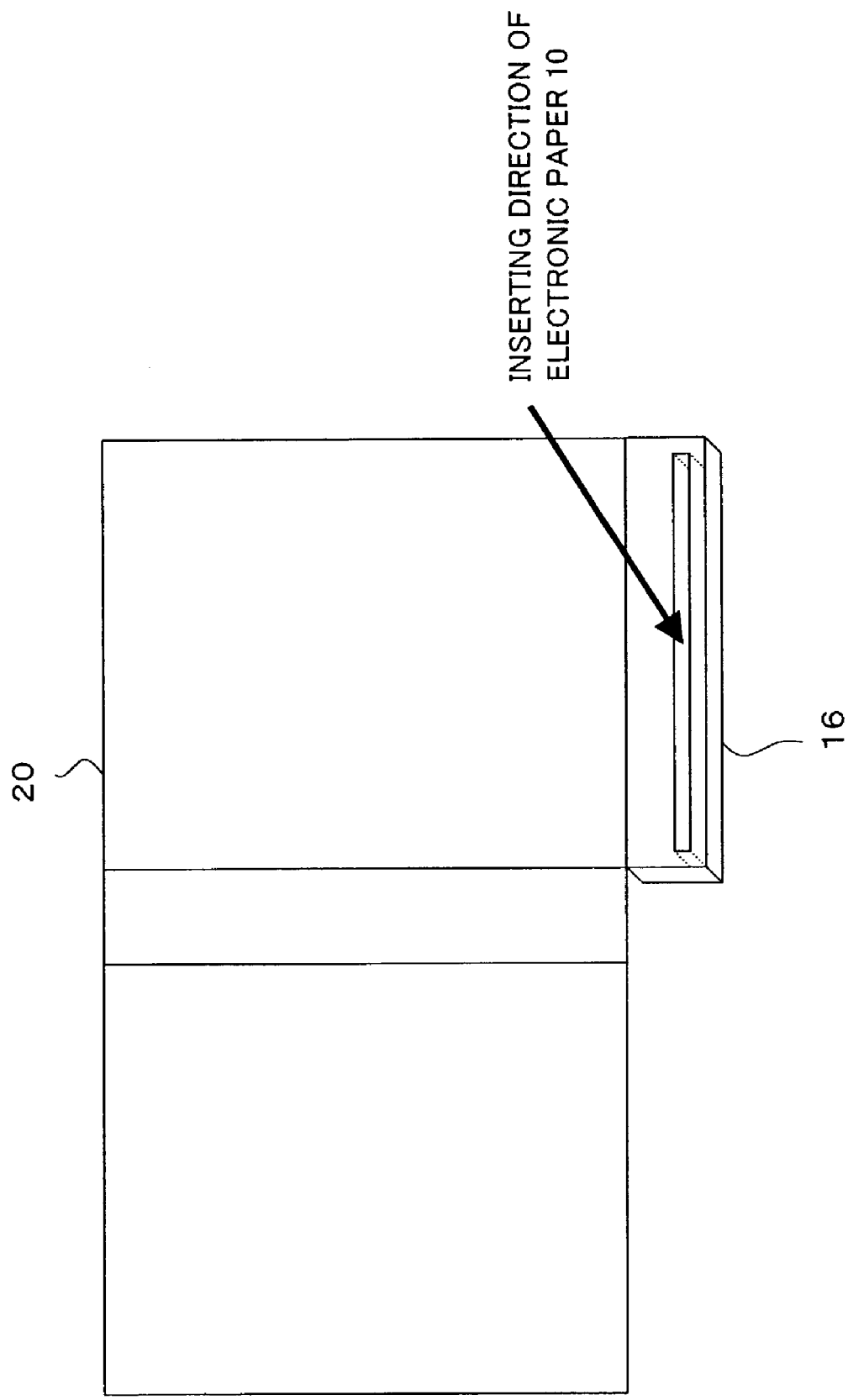
FIG. 31 is a diagram showing the configuration in case of using the sheetfeed scanner.
Figure 32:
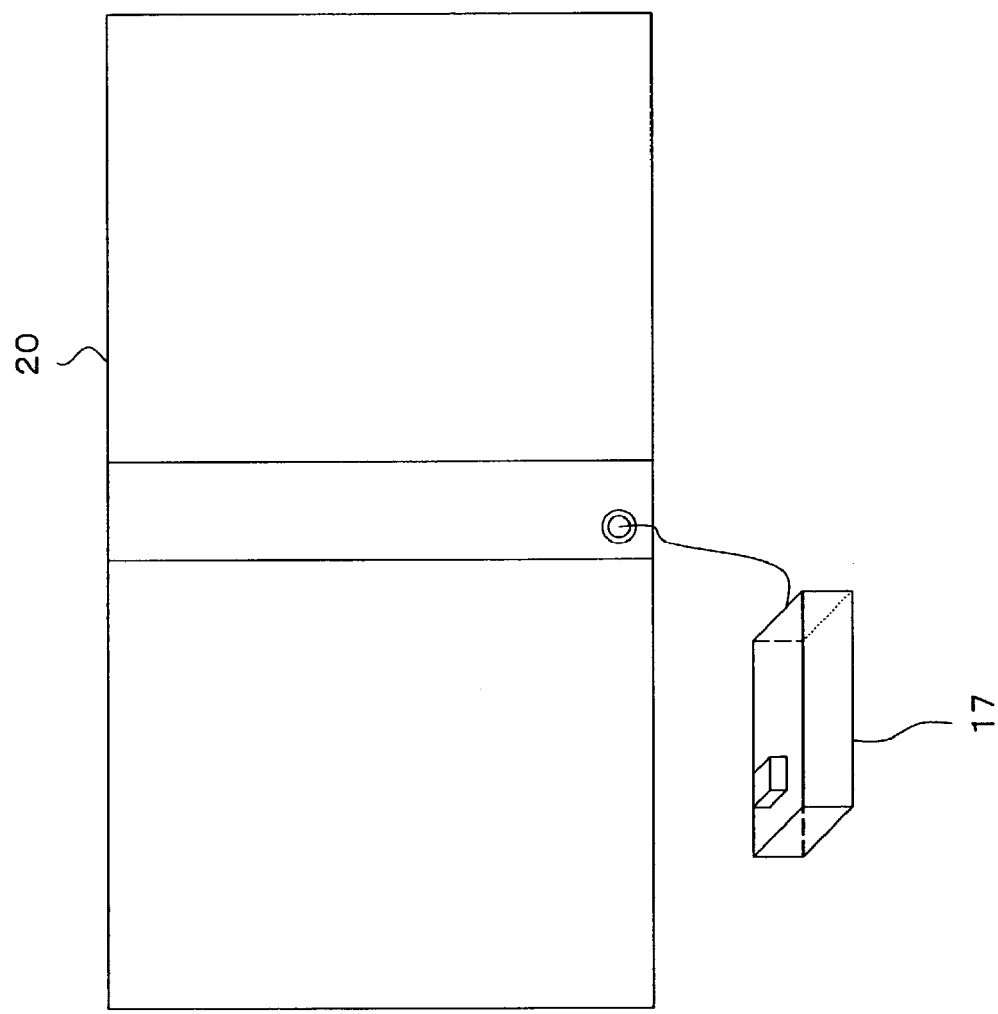
FIG. 32 is a diagram showing the configuration in case of using the hand scanner.
Figure 33:
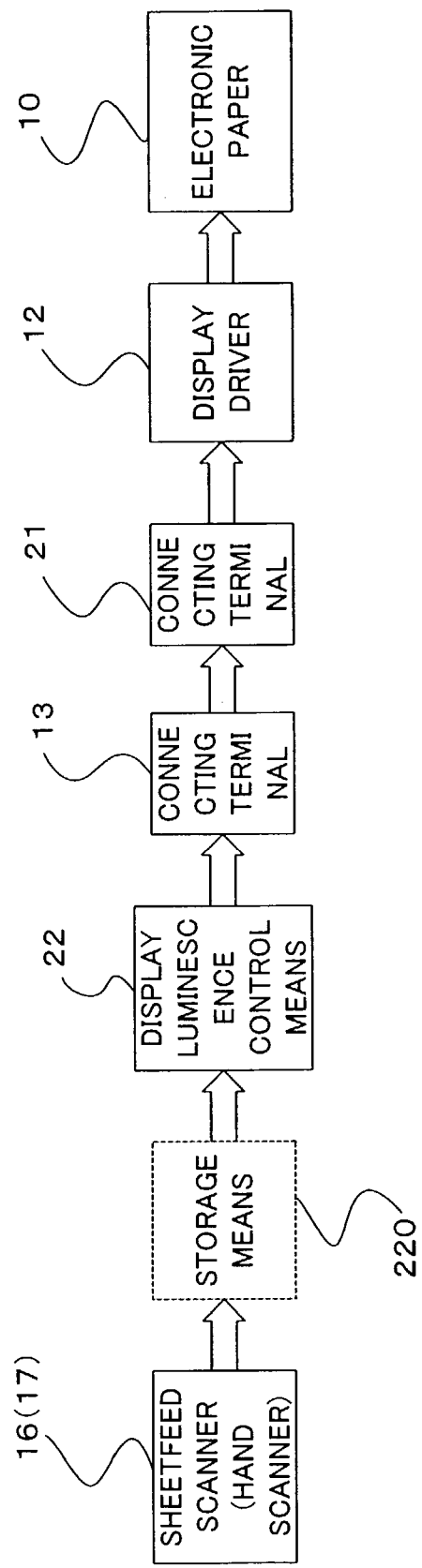
FIG. 33 is a diagram showing the configuration in case of using the scanner.

FIG. 31 shows a case of using a sheetfeed scanner 16, and FIG. 32 shows a case of using a handy scanner 17. Additionally, FIG. 33 shows a simple block diagram of this embodiment of the invention.

The handy scanner 17 is taken to be connected with the control means 21 of the main unit 20 through cable, and the sheetfeed scanner 16 is taken to be fixed to a specific position of the main unit 20. However, there is nothing but to ensure that the sheetfeed scanner 16 and the handy scanner 17 are electrically connected with the control means 21 of the electronic paper file. As this connecting method, it is possible to use the same way as the connecting method of the electronic paper 10 and the main unit 20 described in the embodiment 1.

Under this configuration, in the first place, the characters and graphics are overwritten directly on the display layer A of the display 11 of the electronic paper 10 with the physical means like the ink.

The next step is to read the characters and shapes of graphics on the display layer A together with the positions.

That is to say, in case of using the sheetfeed scanner 16, the overwritten electronic paper 10 is adjusted to a specific position of a slot of the sheetfeed scanner 16 without being attached to the main unit 20. And the electronic paper 10 is passed through the slot from a specific direction, and then the sheet feed scanner 17 reads the characters and shapes of graphics on the display layer A together with the position.

In case of using the handy scanner 17, a specific position of the handy scanner 17 is adjusted to a specific position of the display 11 of the overwritten electronic paper 10. And the handy scanner 17 is moved in a specific direction, and reads the characters and shapes of the graphics on the display layer A together with the position. At this time, the electronic paper 10 needs not to be attached to the main unit 20

As a matter of course, where the electronic paper 10 is not attached to the main unit 20 as above, the main unit 20 requires the storage means 220 for storing the data relevant to the characters and shapes of graphics on the display layer A of the electronic paper 10 read by the sheetfeed scanner 16 or the handy scanner 17, together with the position.

When the characters and graphics on the electronic paper 10 are read as above, the data corresponding to the characters and graphics are inputted to the display luminescence control means 22. Consequently, the display luminescence control means 22 displays on the electronic paper the contents read in this way.

Besides, under the condition that the electronic paper 10 is attached to the main unit, where the information on the display layer A of the electronic paper 10 is read by the handy scanner 17, the characters and graphics corresponding to the information is displayed on the display layer A in real time.

By the way, the sheetfeed scanner 16 is to read the entire position information and the character and graphics information displayed on the display layer A of the electronic paper 10. Thereby, the display luminescence control means 22 is to update the display content by writing into the whole of the display layer A the data received from the sheetfeed scanner 16.

However, even when the position information and the characters and graphics information displayed within the limited area of the display layer A of the electronic paper 10 are read by means of the handy scanner 17, the display luminescence control means 22 has to scan the whole of the display 11. Accordingly, the area of which data is not received from the handy scanner is regarded that there is no data, and since the data before the update is deleted after the update, nothing is to be displayed. This is an inconvenient matter.

Thereupon, the display luminescence control means 22 transmits to the electronic paper 10 the data of "NON" indicating the instruction not to rewrite the display data 18 relevant to the limited area. Thereby, the data of only the limited area on the display area A is to be outputted, consequently the partial writing can be executed.

As described above, it is possible to perform the writing into the electronic paper by the writing means using the canner and the control means of the electronic paper file.

The invention claimed is:

1. An electronic paper file comprising an electronic paper as a flexible display medium, and a main unit provided with display luminescence control means for displaying display data on a display of the electronic paper, further comprising:
    a pair of female and male connecting terminals, one terminal provided to one end of the display of the electronic paper and the other terminal provided to the main unit, so as to allow the electronic paper to be attached or detached from the main unit; and
    a coupling axis formed by joining a plurality of movable axes provided with the other connecting terminal, each rotatable with respect to each other in the axis direction, and - fixed to the main unit so as to be turned freely.

2. An electronic paper file comprising an electronic paper as a flexible display medium, and a main unit provided with display luminescence control means for displaying display data on a display of the electronic paper, further comprising:
    a pair of female and male connecting terminals, one terminal provided to one end of the display of the electronic paper and the other terminal provided to the main unit, so as to allow the electronic paper to be attached to or detached from the main unit; and
    attachment detecting means for detecting the other connecting terminal to which the electronic paper is attached, and informing the display luminescence control means of a connecting terminal number of the detected connecting terminal, wherein
    the display luminescence control means performs the displaying in accordance with the informed connecting terminal number.

3. The electronic paper file according to claim 1, further comprising:
    position detecting means for detecting the rotation position of the other connecting terminal;
    attachment detecting means for detecting the condition whether the electronic paper is attached to or detached from the other connecting terminal and then imparting a connecting terminal number to the other connecting terminal based on the rotation position and the detected condition; and
    the display luminescence control means for performing the displaying on the basis of the connecting terminal number imparted by the attachment detecting means.

4. The electronic paper file according to claim 2 or claim 3, wherein the attachment detecting means is activated when the electronic paper is attached to the other connecting terminal.

5. The electronic paper file according to claim 2 or 3, wherein the attachment detecting means is activated when the power is ON.

6. The electronic paper file according to claim 2 or 3, wherein the attachment detecting means is activated when the display of the electronic paper is reset.

7. The electronic paper file according to claim 1, wherein the connecting terminal includes a necessary number of parallel leads arranged in parallel with the end side of the electronic paper,- the electronic paper file further comprising:
    holding plates for holding the electronic paper from both the backside and front side, wherein the other connecting terminal comprises conducting leads, as many in number as the number of the parallel leads, on the internal surface of the holding plate so that the top end may be in contact with the each parallel lead.

8. The electronic paper file according to claim 1 or 2, wherein a nonvolatile display medium is used as the display medium of the electronic paper.

9. The electronic paper file according to claim 8, wherein a ferroelectric high polymer liquid crystal is used as the nonvolatile display medium.

10. The electronic paper file according to claim 1 or claim 2, wherein the one connecting terminal is a male type and the other connecting terminal is a female type.

11. The electronic paper file according to claim 1 or claim 2, wherein the display luminescence control means comprises,
 display control means for displaying display data on the display of the electronic paper file; and
 luminescence control means for permitting a luminescence layer to emit the light when the power of electronic paper file is ON.

12. The electronic paper file according to claim 1 or 2, wherein the display of the electronic paper comprises a display layer using—a nonvolatile display medium and a luminescence layer for illuminating the display layer.

13. The electronic paper file according to claim 12, wherein an organic electro luminescence is used for the luminous material of the luminescence layer.

14. The electronic paper file according to claim 12, wherein the display luminescence control means controls the luminescence layer so as to illuminate only a specific area of the display layer.

15. The electronic paper file according to claim 12, wherein the main unit is provided with the display luminescence control means for controlling the brightness of the luminescence layer.

16. The electronic paper file according to claim 12, wherein the luminescence layer is provided with luminous material corresponding to a plural of colors.

17. The electronic paper file according to claim 12, wherein the light emitted from the luminescence layer passes through a film having a rough surface.

18. The electronic paper file according to claim 12, wherein a ferroelectric high polymer liquid crystal is used as the nonvolatile display medium.

19. The electronic paper file according to claim 1 or claim 2, further comprising a display driver unit installing a display driver for reducing the number of connecting terminals between the connecting terminal and the display.

20. The electronic paper file according to claim 19, wherein a thickness of the display driver unit is larger than that of the display.

21. The electronic paper file according to claim 19 wherein a width of the display driver unit is larger than that of the display.

22. The electronic paper file according to claim 19, wherein the Young's modulus of the member used for the display driver unit is larger than that of the display.

23. An electronic paper file comprising:
 multiple electronic papers, each provided with a display and a display luminescence control means for transmitting display data to the electronic paper, wherein
 each electronic paper comprises the display using a nonvolatile display medium, and
 the display is provided with writing means for writing the display data, the writing means comprising:
  a transparent sheet configured to detect a contact position of a writing material and to observe the display therethrough when overlapped on the display, the sheet includes an edge fixed to either a front cover or a back cover of a main unit so as to be used by each electronic paper; and
  writing detecting means for preparing, at a position on the display corresponding to position information obtained through the transparent sheet, writing data corresponding to characters and graphics illustrated by touching with the writing material, and transmitting the writing data to the display luminescence control means,
 the electronic paper file further comprising:
 a pair of female and male connecting terminals, one terminal provided to one end of the display of each electronic paper and the other terminal provided to the main unit so as to allow each electronic paper to be attached or detached from the main unit; and
 facing page detecting means for detecting whether each electronic paper is contacted or separated, wherein
 a position to place the other connecting terminal on the main unit is fixed.

24. An electronic paper file comprising:
 an electronic paper provided with a display and a display luminescence control means for transmitting display data to the electronic paper, wherein
 the electronic paper comprises the display using a nonvolatile display medium, and
 the display is provided with writing means for writing the display data, the writing means comprising:
  a transparent sheet configured to detect a contact position of a writing material and to observe the display therethrough when overlapped on the display, the sheet includes a side fixed to a side of either a front cover or a back cover so as to be used by each electronic paper; and
  writing detecting means for preparing, at a position on the display corresponding to position information obtained through the transparent sheet, writing data corresponding to characters and graphics illustrated by touching with the writing material, and transmitting the writing data to the display luminescence control means,
 the electronic paper file further comprising:
 a pair of female and male connecting terminals, one terminal provided to one end of the display of the electronic paper and the other terminal provided to the main unit so as to allow the electronic paper to be attached or detached from the main unit, wherein
 a position to place the other connecting terminal on the main unit is fixed, and
 the rotation axis rotatable to the main unit is provided with the transparent sheet, a step of writing by the writing means can be recognized in accordance with the rotation angle of the coupling axis.

25. An electronic paper file comprising:
 an electronic paper provided with a display and a display luminescence control means for transmitting display data to the electronic paper, wherein
 the electronic paper comprises the display using a nonvolatile display medium, and
 the display is provided with writing means for writing the display data, the writing means comprising:
  a transparent sheet configured to detect a contact position of a writing material and to observe the display therethrough when overlapped on the display, the sheet includes a side fixed to a side of either a front cover or a back cover so as to be used by each electronic paper; and writing detecting means for preparing, at a position on the display corresponding to position information obtained through the transparent sheet, writing data corresponding to characters and graphics illustrated by touching with the writing material, and transmitting the writing data to the display luminescence control means, the electronic paper file further comprising:

a pair of female and male connecting terminals, one terminal provided to one end of the display of the electronic paper and the other terminal provided to the main unit so as to allow the electronic paper to be attached or detached from the main unit, wherein the other connecting terminal is provided with a rotatable axis part, and a coupling axis is formed by joining a plurality of the rotatable axis parts, each rotatable with respect to each other in the axis direction, and the coupling axis is fixed to the main unit so as to be turned freely.

26. The electronic paper file according to claim 25, further comprising facing page detecting means for detecting whether the each page are contacted or separated.

27. The electronic paper file according to claim 25, wherein the facing page detecting means is a position detecting means for detecting a rotation angle of the coupling axis on the main unit.

28. The electronic paper file according to claim 25, wherein the rotation axis rotatable to the main unit is provided with the transparent sheet, a step of writing by the writing means can be recognized in accordance with the rotation angle of the coupling axis.

* * * * *